US009127850B2

(12) United States Patent
Lee et al.

(10) Patent No.: US 9,127,850 B2
(45) Date of Patent: Sep. 8, 2015

(54) AIR CONDITIONER USING PHOTOVOLTAIC ENERGY

(75) Inventors: Choonghee Lee, Changwon-si (KR); Jintag Choi, Changwon-si (KR)

(73) Assignee: LG ELECTRONICS INC., Seoul (KR)

( * ) Notice: Subject to any disclaimer, the term of this patent is extended or adjusted under 35 U.S.C. 154(b) by 911 days.

(21) Appl. No.: 13/039,482

(22) Filed: Mar. 3, 2011

(65) Prior Publication Data

US 2011/0225992 A1   Sep. 22, 2011

(30) Foreign Application Priority Data

Mar. 22, 2010   (KR) .................. 10-2010-0025403

(51) Int. Cl.
| | |
|---|---|
| F24F 1/00 | (2011.01) |
| F24F 5/00 | (2006.01) |
| F24F 1/56 | (2011.01) |
| F24F 11/00 | (2006.01) |

(52) U.S. Cl.
CPC ............. *F24F 1/0003* (2013.01); *F24F 1/56* (2013.01); *F24F 5/0046* (2013.01); *F24F 2005/0067* (2013.01); *F24F 2011/0075* (2013.01)

(58) Field of Classification Search
CPC ............. F24F 2005/0046; F24F 2011/0075; F24F 2005/0064; F24F 2005/0067; F24F 1/56
USPC ........................ 62/235.1, 78; 95/20
See application file for complete search history.

(56) References Cited

U.S. PATENT DOCUMENTS

| | | | | |
|---|---|---|---|---|
| 7,426,836 | B2* | 9/2008 | Jmaev ............................. | 62/115 |
| 7,539,029 | B2* | 5/2009 | Luerkens et al. ............... | 363/37 |
| 2005/0011199 | A1* | 1/2005 | Grisham et al. ................. | 62/3.7 |
| 2007/0240442 | A1* | 10/2007 | Costanzo ..................... | 62/235.1 |
| 2007/0245755 | A1* | 10/2007 | Galvez-Ramos ............ | 62/235.1 |
| 2007/0261415 | A1* | 11/2007 | Barnes ................................ | 62/5 |
| 2009/0178421 | A1* | 7/2009 | Yeh ................................. | 62/132 |
| 2009/0183521 | A1* | 7/2009 | Shibuya et al. .............. | 62/259.1 |

FOREIGN PATENT DOCUMENTS

| | | |
|---|---|---|
| EP | 0576280 | 12/1993 |
| JP | 4-174262 | 6/1992 |
| JP | 2000-028176 | 1/2000 |
| KR | 10-2004-0085963 | 10/2004 |

OTHER PUBLICATIONS

European Search Report issued in EP Application No. 11153076.2 dated Jul. 30, 2012.
Korean Office Action dated Oct. 19, 2011.

* cited by examiner

*Primary Examiner* — Ljiljana Ciric
*Assistant Examiner* — Alexis Cox
(74) *Attorney, Agent, or Firm* — Ked & Associates LLP

(57) ABSTRACT

An air conditioner using photovoltaic energy is provided. The air conditioner may include a photovoltaic cell for converting photovoltaic energy into Direct Current (DC) power, an indoor unit for exchanging heat, and an outdoor unit for exchanging heat. Photovoltaic power generated by the photovoltaic cell may be supplied to the indoor unit and used as at least one of standby power in a standby mode, consumption power in an automatic photovoltaic mode, or auxiliary power in a cooling mode.

10 Claims, 19 Drawing Sheets

(a)    (b)

AIR CONDITIONER USING PHOTOVOLTAIC ENERGY

CROSS-REFERENCE TO RELATED APPLICATION(S)

This application claims priority under 35 U.S.C. §119 to Korean Application No. 10-2010-0025403 filed in Korea on Mar. 22, 2010, the entirety of which is incorporated herein by reference.

BACKGROUND

1. Field

This relates to an air conditioner using photovoltaic energy, and more particularly, to an air conditioner using photovoltaic energy to reduce power consumption.

2. Background

An air conditioner is a home appliance, system or mechanism designed to keep an indoor atmosphere comfortable by controlling temperature, humidity, air purity, and air flow in a space such as a room, an office or a store.

Air conditioners are roughly categorized into an integrated type and a separate type. An integrated-type air conditioner and a separate-type air conditioner are identical in terms of function, but they differ in that the integrated-type air conditioner integrates cooling and condensation and is mounted through an opening in a wall or on a mount bracket through a window, whereas the separate-type air conditioner has an indoor unit installed indoors, for cooling/heating and an outdoor unit installed outdoors connected to the indoor unit by means of a refrigerant pipe, for condensation and compression.

BRIEF DESCRIPTION OF THE DRAWINGS

The embodiments will be described in detail with reference to the following drawings in which like reference numerals refer to like elements wherein.

DETAILED DESCRIPTION

Exemplary embodiments of the present invention will be described below with reference to the attached drawings.

The terms "module" and "unit" are used to signify components in order to help the understanding of the components and thus should not be considered as having specific meanings or roles. Accordingly, the terms "module" and "unit" may be used interchangeably.

Referring to FIGS. 1 to 3B, an air conditioner 100 according to an exemplary embodiment as broadly described herein may include a photovoltaic cell 120, an outdoor unit 150, and an indoor unit 200.

Figure 1:
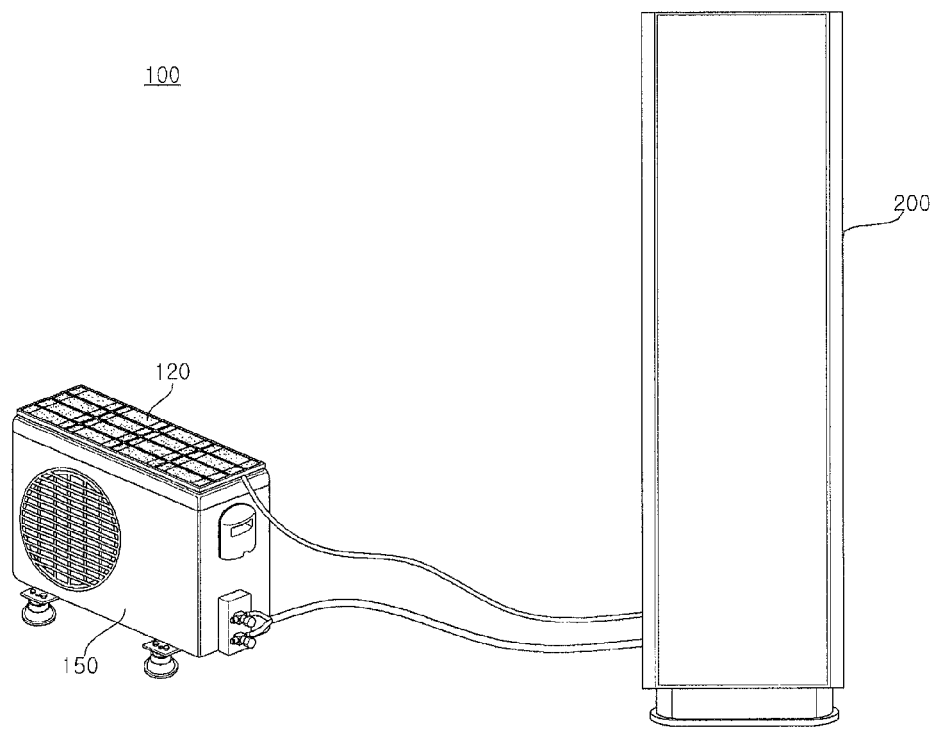
FIG. 1 illustrates the configuration of an air conditioner according to an exemplary embodiment as broadly described herein.
Figure 2:
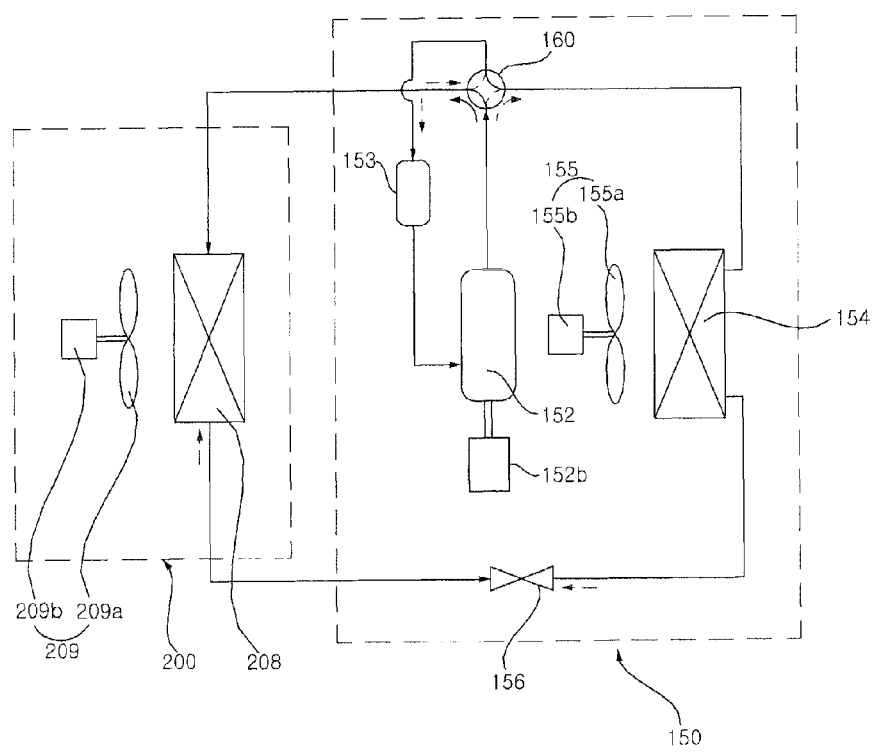
FIG. 2 is a schematic diagram of the air conditioner illustrated in FIG. 1.
Figure 3:
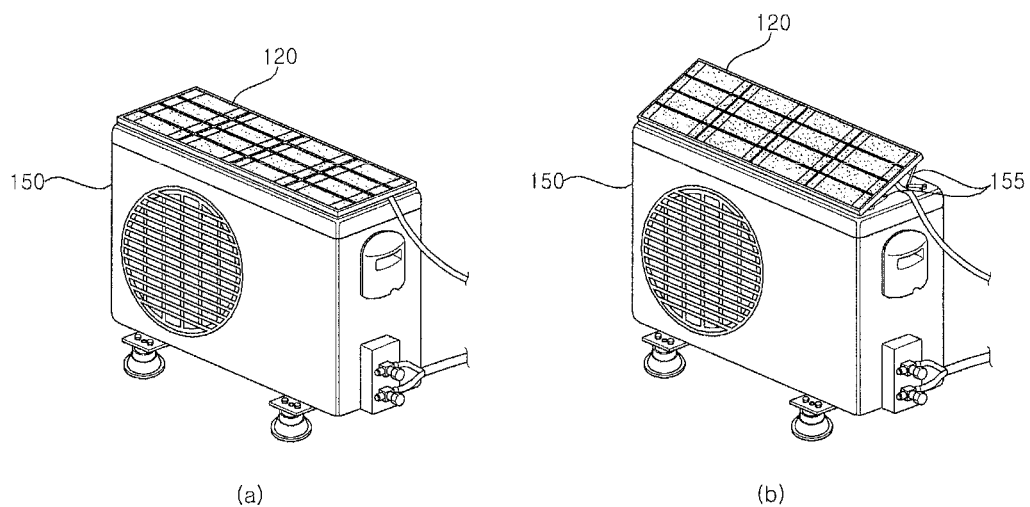
FIGS. 3A and 3B are enlarged views of a photovoltaic cell illustrated in FIG. 1.

The photovoltaic cell 120 converts photovoltaic energy into electric energy. The photovoltaic cell 120 may take the form of at least one module. In FIG. 1, a plurality of photovoltaic cells 120 are arranged in an array, by way of example.

Preferably, the photovoltaic cell 120 is mounted on the top surface of the outdoor unit 150, for active conversion from photovoltaic energy to electric energy.

The photovoltaic cell 120 mounted on the top surface of the outdoor unit 150 as illustrated in FIG. 3A may be tilted by use of a tilting device 155 so that the photovoltaic cell 120 is at a changed angle or position, as illustrated in FIG. 3B. For example, the tilting device 150 may be operated so that the photovoltaic cell 120 is at a right angle to the sun. It is shown in FIG. 3B that a plurality of tilting devices 155 are installed on both sides of the photovoltaic cell 120 and at least one of the tilting devices 155 is selectively operated. The tilting devices 155 may be driven by a motor.

An operation of a tilting device 155 may be controlled according to the level of DC power obtained by photovoltaic to electrical conversion at the photovoltaic cell 120. For example, if the level of the DC power is lower than a predetermined threshold, the tilting device 155 may be operated to tilt the photovoltaic cell 120 at a different angle or to a different position. In addition, DC power may be detected from the photovoltaic cell 120 at the changed tilted angle or position, an optimum tilting angle or position may be calculated by repeating the operation of changing the tilting angle or position and detecting DC power, and thus the tilting device 155 may be operated to tilt the photovoltaic cell 120 at the optimum tilting angle or to the optimum tilting position.

The following description is made with the appreciation that electrical energy converted from photovoltaic energy by the photovoltaic cell 120 is DC power.

The outdoor unit 150 operates in a cooling mode or a heating mode upon request of the indoor unit 200 connected to the outdoor unit 150 or according to an external control command, and supplies refrigerant to the indoor unit 200.

To operate in the cooling mode or the heating mode and supply the refrigerant to the indoor unit 200, the outdoor unit 150 includes a compressor 152 for compressing the refrigerant, a compressor motor 152b for driving the compressor 152, an outdoor heat exchanger 154 for condensing the compressed refrigerant, an outdoor blower 155 that has an outdoor fan 155a at a side of the outdoor heat exchanger 154, for accelerating the refrigerant condensation and a motor 155b for rotating the outdoor fan 155a, an expansion device 156 for expanding the condensed refrigerant, a cooling/heating switching valve 160 for switching the flow direction of the compressed refrigerant, and an accumulator 153 for temporarily storing the vaporized refrigerant, removing moisture and foreign materials from the vaporized refrigerant, and supplying the refrigerant at a predetermined pressure to the compressor 152. The accumulator 153 may be an inverter compressor or a constant-speed compressor.

The outdoor unit 150 may further include at least one pressure sensor (not shown) for measuring the pressure of the refrigerant and at least one temperature sensor (not shown) for measuring temperature.

The indoor unit 200 includes an indoor heat exchanger 208 installed indoors, for cooling/heating the air and an indoor blower 209 that has an indoor fan 209a installed at a side of the indoor heat exchanger 208, for accelerating the condensation of the refrigerant and a motor 209b for rotating the indoor fan 209a. At least one indoor heat exchanger 208 may be installed.

The indoor unit 200 may further include an air outlet (not shown) for exhausting heat-exchanged air and a flow direction controller (not shown) for opening or closing the air outlet and controlling the direction of air exhausted from the air outlet. For example, a vane may be provided to guide the air, while opening or closing at least one of an air inlet (not shown) and the air outlet. That is, the vane may guide the directions of introduced air and exhausted air as well as opening or closing the air inlet and the air outlet.

The indoor unit 200 may control an air flow rate by controlling introduced air and exhausted air according to the rotation speed of the indoor fan 209a.

The indoor unit 200 may further include a display (not shown) for displaying an operation state of the indoor unit 200 and setting information about the indoor unit 200, and an input unit (not shown) for inputting setting data. Additionally, the indoor unit 200 may include an indoor temperature sensor (not shown) for sensing an indoor temperature and a human body sensor (not shown) for sensing the presence of a person in an interior space.

The air conditioner 100 may be implemented into a cooler for cooling indoor air, or a heat pump for cooling or heating indoor air.

While the indoor unit 200 is depicted as being a stand type, this is merely an exemplary application. Thus the indoor unit 200 may be a ceiling-mounted type or a wall-mounted type. Also, the air conditioner 100 may be configured to be an integrated type in which there is no distinction between an indoor unit and an outdoor unit.

The indoor unit 200 is connected to the outdoor unit 150 via a refrigerant pipe. Cooled/heated air is blown into the interior space from the indoor unit 200 according to the circulation of the refrigerant. A single outdoor unit 150 may be connected to a plurality of indoor units 200. Or at least one indoor unit 200 may be connected to each of a plurality of outdoor units 150.

A communication line may connect the indoor unit 200 to the outdoor unit 150, for transmitting and receiving control commands according to a predetermined communication scheme.

Meanwhile, the photovoltaic cell 120 is connected to the indoor unit 200 via a power supply line and thus the photovoltaic cell 120 may supply power to the indoor unit 200.

Figure 4:
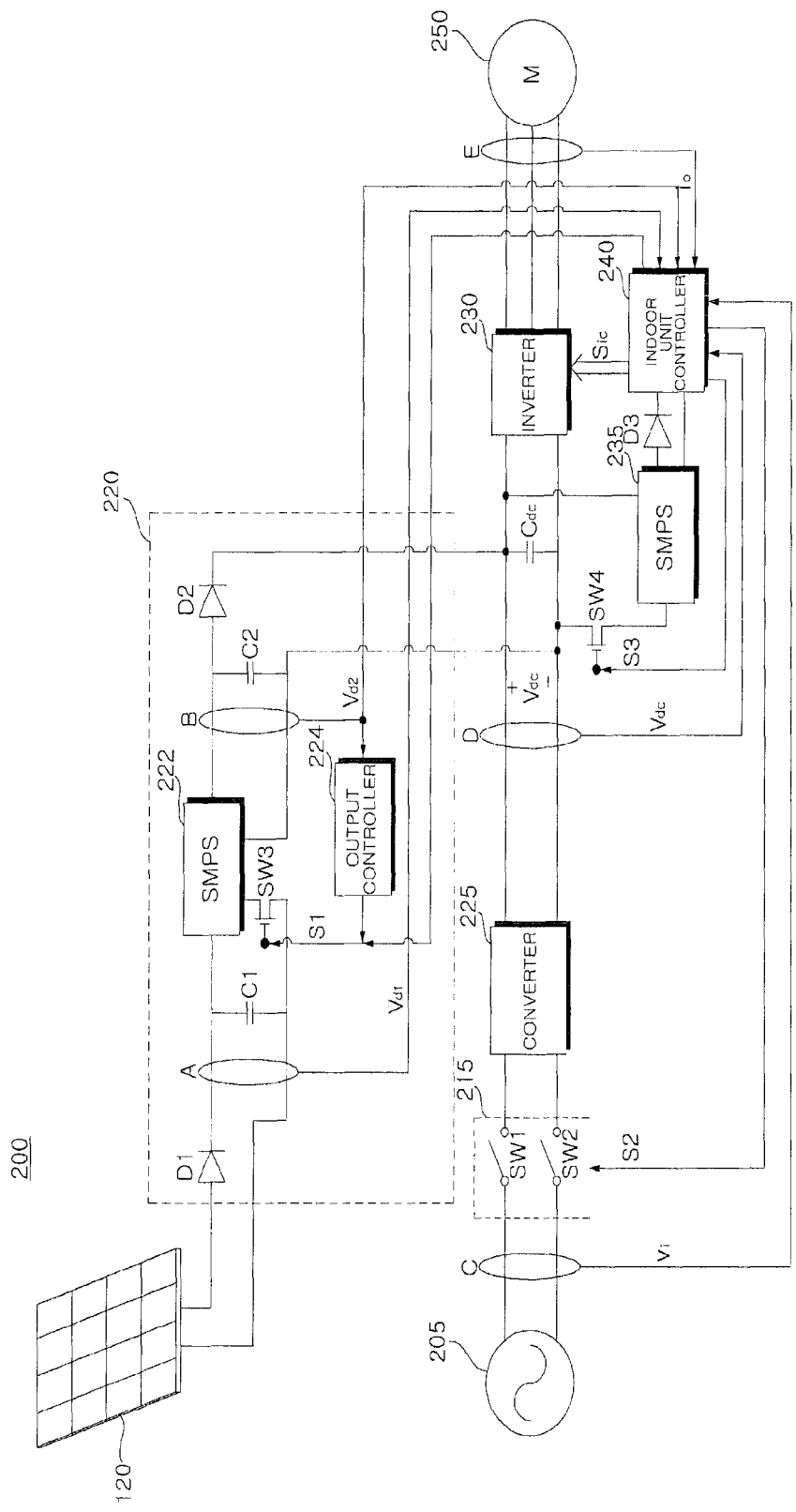
FIG. 4 is a circuit diagram of an indoor unit illustrated in FIG. 1 according to an exemplary embodiment as broadly described herein.
Figure 5:
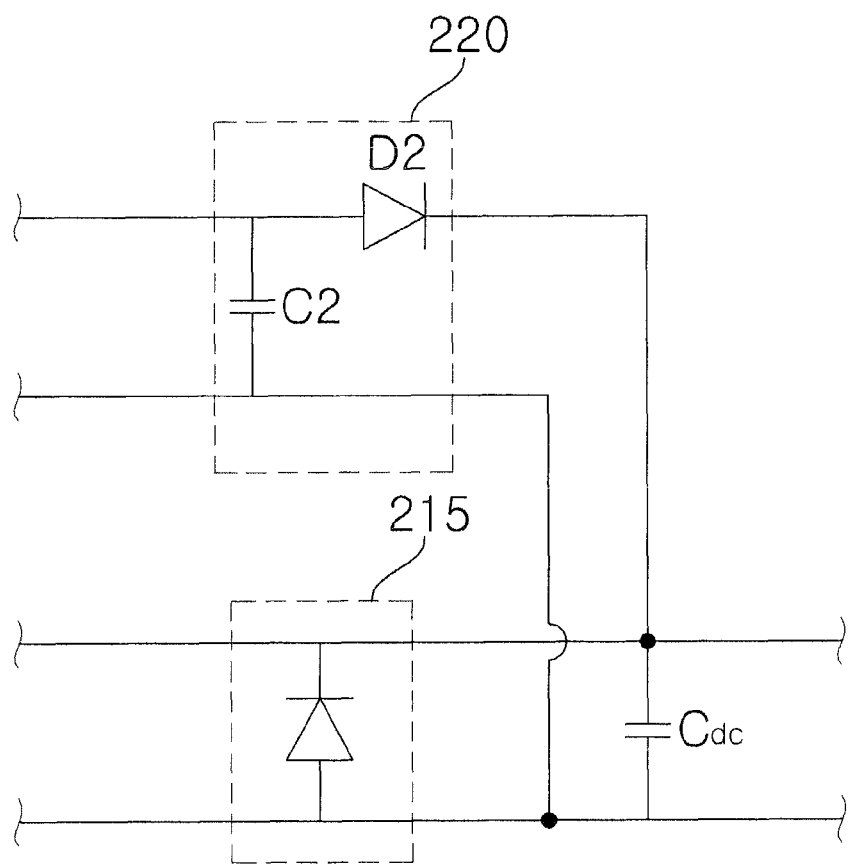
FIG. 5 is a simplified circuit diagram of the indoor unit illustrated in FIG. 4.

FIG. 4 is a circuit diagram of the indoor unit illustrated in FIG. 1 according to an exemplary embodiment as broadly described herein and FIG. 5 is a simplified circuit diagram of the indoor unit illustrated in FIG. 4.

Referring to FIGS. 4 and 5, the indoor unit 200 may include an AC power switching unit 215, a DC/DC converter 220, a converter 225, an inverter 230, an indoor unit controller 240, and a fan motor 250.

The AC power switching unit 215 switches AC power 205 to the converter 225. For the AC power switching, the AC power switching unit 215 includes at least one switching element. The AC power 205 is shown as single-phase AC power, by way of example. Thus the AC switching unit 215 includes two switching elements SW1 and SW2. It is also possible for the AC power 205 to be three-phase AC power, in which case the AC power switching unit 215 includes three switching elements.

Switching operations of the switching elements SW1 and SW2 of the AC power switching unit 215 may be controlled according to a switching control signal S2 from the indoor unit controller 240. An operation of the AC power switching unit 215 will be described later in conjunction with the DC/DC converter 220 and the indoor unit controller 240.

The DC/DC converter 220 changes the level of DC power received from the photovoltaic cell 120 and outputs the level-changed DC power to a DC-end capacitor Cdc. For example, the DC/DC converter 220 may increase the voltage level of DC power generated from the photovoltaic cell 120.

For changing the level of DC power, the DC/DC converter 220 may include a Switching Mode Power Supply (SMPS) 222 and an output controller 224.

As illustrated in FIG. 4, the DC/DC converter 220 may further include a diode D1 for unidirectional conduction of DC power generated from the photovoltaic cell 120, a capacitor C1 for storing the DC power from the photovoltaic cell 120, a capacitor C2 for storing level-changed DC power received from the SMPS 222, a diode D2 for conducting the level-changed DC power unidirectionally to the DC-end capacitor Cdc, and a switching element SW3 connected to the SMPS 222, for switching.

The DC/DC converter 220 may further include an input voltage detector A for sensing the DC power received from the photovoltaic cell 120 and an output voltage detector B for sensing the level-changed DC power output from the SMPS 222.

An input voltage Vd1 detected by the input voltage detector A is supplied to the indoor unit controller 240, for use in calculating the level of the photovoltaic power supplied by the photovoltaic cell 120. While not shown, the DC/DC converter 220 may further include an input current detector (not shown) for sensing input current from the photovoltaic cell 120.

Meanwhile, an output voltage Vd2 detected by the output voltage detector B may be supplied to the indoor unit controller 240 or the output controller 224. The detected output voltage Vd2 may be used to generate a switching control signal S1 for the switching element SW3 that switches to operate the SMPS 222. The detected output voltage Vd2 supplied to the indoor unit controller 240 is used to calculate the power output from the DC/DC converter 220.

While the DC/DC converter 220 is shown in FIG. 4 as residing in the indoor unit 220, which does not limit the present invention, it may be contemplated that the DC/DC converter 220 and the photovoltaic cell 120 are incorporated into one module.

The converter 225 converts the AC power 205 switched by the AC power switching unit 215 into DC power. For the AC-to-DC conversion, the converter 225 may include at least one diode or at least one switching element. Although the converter 225 is shown in FIG. 5 as including a diode, this should not be construed as limiting the present invention.

The inverter 230 includes a plurality of inverter switching elements, converts DC power Vdc of the DC-end capacitor Cdc to AC power with a predetermined frequency and a predetermined level, and outputs the AC power to the fan motor 250.

In the inverter 230, serially connected upper arm switching elements Sa, Sb and Sc may be paired with lower arm switching elements S'a, S'b and S'c, respectively. The three pairs of upper and lower arm switching elements Sa & S'a, Sb & S'b and Sc & S'c may be connected to one another in parallel. The switching elements Sa, S'a, Sb, S'b, Sc and S'c may be connected in inverse parallel to diodes Da, D'a, Db, D'b, Dc and D'c in a one to one correspondence.

The switching elements of the inverter 230 switch on or off according to an inverter switching control signal Sic received from the indoor unit controller 240. The pulse width of the inverter switching control signal Sic changes according to the on/off operation of each switching element. Thus three-phase AC power having a predetermined frequency is output to the fan motor 250.

The fan motor 250 may be a three-phase motor. The fan motor 250 is provided with stators and rotors. As each phase AC power having a predetermined frequency is applied to the coil of each phase stator, the rotors are rotated. Various types of motors including a Blushless DC (BLDC) motor and a Synchronous Reluctance Motor (syncRM) are available as the fan motor 250.

An input voltage detector C detects an input voltage vi from the AC power 205. To detect the power, a resistor or an OPerational AMPlifier (OP AMP) may be used. The detected input voltage vi may be applied in the form of a discrete pulse signal to the indoor unit controller 240. The indoor unit controller 240 may generate a switching control signal S2 to control switching of the AC power switching unit 215 based on the input voltage vi. Additionally, the indoor unit controller 240 may determine whether the AC power 205 is off based on the input voltage vi.

A DC voltage detector D detects the DC voltage Vdc of the DC-end capacitor Cdc. For the power detection, a resistor or an OP AMP may be used. The detected DC voltage Vdc of the DC-end capacitor Cdc may be applied in the form of a discrete pulse signal to the indoor unit controller 240. The indoor unit controller 240 generates a charge/discharge switching control signal Scc based on the DC voltage Vdc of the DC-end capacitor Cdc.

In the mean time, an output current detector E detects an output current Io flowing between the inverter 230 and the three-phase fan motor 250. That is, the output current detector E detects a current flowing through the fan motor 250. The output current detector E may detect all of output currents in the three phases u, v and w of the fan motor 250 or output currents in one or two phases by three-phase balancing.

The output current detector E may be interposed between the inverter 230 and the fan motor 250. For the current detection, a current sensor, a Current Transformer (CT), or a shunt resistor may be used. The detected output current io may be applied in the form of a discrete pulse signal to the indoor unit controller 240, for use in generation of the inverter switching control signal Sic.

The indoor unit controller 240 may provide control to various operations of the indoor unit 200.

For example, if photovoltaic power supplied from the photovoltaic cell 120 is greater than required standby power, the indoor unit controller 240 may control DC power supplied from the photovoltaic cell 120 to be used as the standby power for a standby mode.

If the detected input voltage Vd1 is equal to or greater than a first threshold voltage VH, the indoor unit controller 240 turns on the switching element SW3 of the DC/DC converter 220 by outputting the switching control signal S1 to the switching element SW3 so that voltage-boosted power may be output. The voltage-boosted power is supplied to the DC-end capacitor Cdc. Additionally, the indoor control unit 240 outputs the switching control signal S2 to turn off the switching elements SW1 and SW2 of the AC power switching unit 215.

The standby power is stored in the DC-end capacitor Cdc and only minimum required power, namely the required standby power, is supplied to the indoor unit controller 240.

If the detected input voltage Vd1 is lower than a second threshold voltage VL, the indoor unit controller 240 cuts off the DC power from the photovoltaic cell 120 to the DC-end capacitor Cdc by turning off the switching element SW3 of the DC/DC converter 220. Then the indoor unit controller 240 may turn on the switching elements SW1 and SW2 of the AC power switching unit 215 to thereby supply the standby power to the DC-end capacitor Cdc.

In another example, if the photovoltaic power supplied from the photovoltaic cell 120 is greater than the required standby power, the indoor unit controller 240 outputs the switching control signal S2 to turn on the switching elements SW1 and SW2 of the AC power switching unit 215. Thus the AC power 205 is converted to DC power in the converter 225 and is supplied to the DC-end capacitor Cdc. In the mean time, the switching element S3 of the DC/DC converter 220 may be turned on and thus the photovoltaic power from the photovoltaic cell 120 may be supplied as auxiliary power to the DC-end capacitor Cdc.

In a further example, if the photovoltaic power supplied from the photovoltaic cell 120 is greater than the required standby power and an automatic photovoltaic mode is set through an input unit such as a remote controller, the indoor unit controller 240 may control the photovoltaic energy from the photovoltaic cell 120 to be used in the automatic photovoltaic mode.

While the indoor unit controller 240 is shown as controlling only the inverter 230 to drive the fan motor 250 in FIG. 4, it is to be noted that the indoor unit controller 240 may additionally, in the automatic photovoltaic mode, drive vanes for air purification (refer to FIG. 8), drive automatic cleaning units (refer to FIG. 9), control lighting units (refer to FIG. 10), control a display (refer to FIGS. 11 and 12), control charging of other electronic devices (refer to FIGS. 13 and 14), control a dehumidification mode (refer to FIG. 15) using a heat line, control the dehumidification mode using hot water (refer to FIG. 18), and control a heating mode using hot water (refer to FIG. 19), which will be described below with reference to FIGS. 7 to 19.

If the photovoltaic power runs out during an operation in the automatic photovoltaic mode, the indoor unit controller 240 may temporarily discontinue the automatic photovoltaic mode. If the photovoltaic power exceeds consumption power for the automatic photovoltaic mode later, the indoor unit controller 240 may resume the automatic photovoltaic mode.

To control the inverter 230 for driving the fan motor 250, the indoor unit controller 240 may include an estimator (not shown), a current command generator (not shown), a voltage command generator (not shown), and a switching control signal output unit (not shown).

The estimator estimates the speed v of the fan motor 250 based on the output current io detected by the output current detector E. The estimator may also estimate the positions of the rotors of the fan motor 250. The speed v may be estimated by comparing mechanical and electrical equations of the fan motor 250. For the speed estimation, the estimator may convert the three-phase output current io to d-axis and q-axis currents.

The current command generator generates a current command value (i*d, i*q) based on the estimated speed v and a speed command value v*. For the operation, the current command generator may include a Proportional Integral (PI) controller (not shown) for performing PI control based on the difference between the estimated speed v and the speed command value v* and a limiter (not shown) for limiting the current command value (i*d, i*q) to or below an allowed range.

The voltage command generator generates a voltage command value (v*d, v*q) based on the detected output current io and the calculated current command value (i*d, i*q). For the operation, the voltage command generator may include a PI controller (not shown) for performing PI control based on the difference between the detected output current io and the calculated current command value (i*d, i*q) and a limiter (not shown) for limiting the voltage command value (v*d, v*q) to or below an allowed range.

The switching control signal output unit may finally output the inverter switching control signal Sic based on the voltage command value (v*d, v*q). For example, the switching control signal output unit may calculate switching vector time information T0, T1 and T2 based on the voltage command value (v*d, v*q) by a space vector technique and output the inverter switching control signal Sic based on the switching vector time information T0, T1 and T2.

Therefore, the switching elements Sa, S'a, Sb, S'b, Sc and S'c of the inverter 230 may switch on or off.

As described above, since the indoor unit 200 may convert DC power received from the photovoltaic cell 120 using the DC/DC converter 220 and supply the converted DC power to the DC-end capacitor Cdc, the external power may be efficiently supplied to the DC-end capacitor Cdc.

In the indoor unit 200, the DC-end capacitor Cdc may store or smooth the DC power from the photovoltaic cell 120 or DC power converted from the AC power 205. The power of the DC-end capacitor Cdc may be used to drive the fan motor 250 or as operation power for the indoor unit controller 240.

While the indoor unit controller 240 is shown in FIG. 4 as directly controlling the inverter 230 for driving the fan motor 250, it may also be contemplated that the indoor unit controller 240 controls the DC/DC converter 220 and the AC power switching unit 215, except the inverter 230. The fan motor 250, the inverter 230, and an additional controller (not shown) may be incorporated into a module so that the additional controller controls the inverter 230. A voltage used at the inverter 230 may be the DC-end voltage Vdc, as illustrated in FIG. 4.

Figure 6:
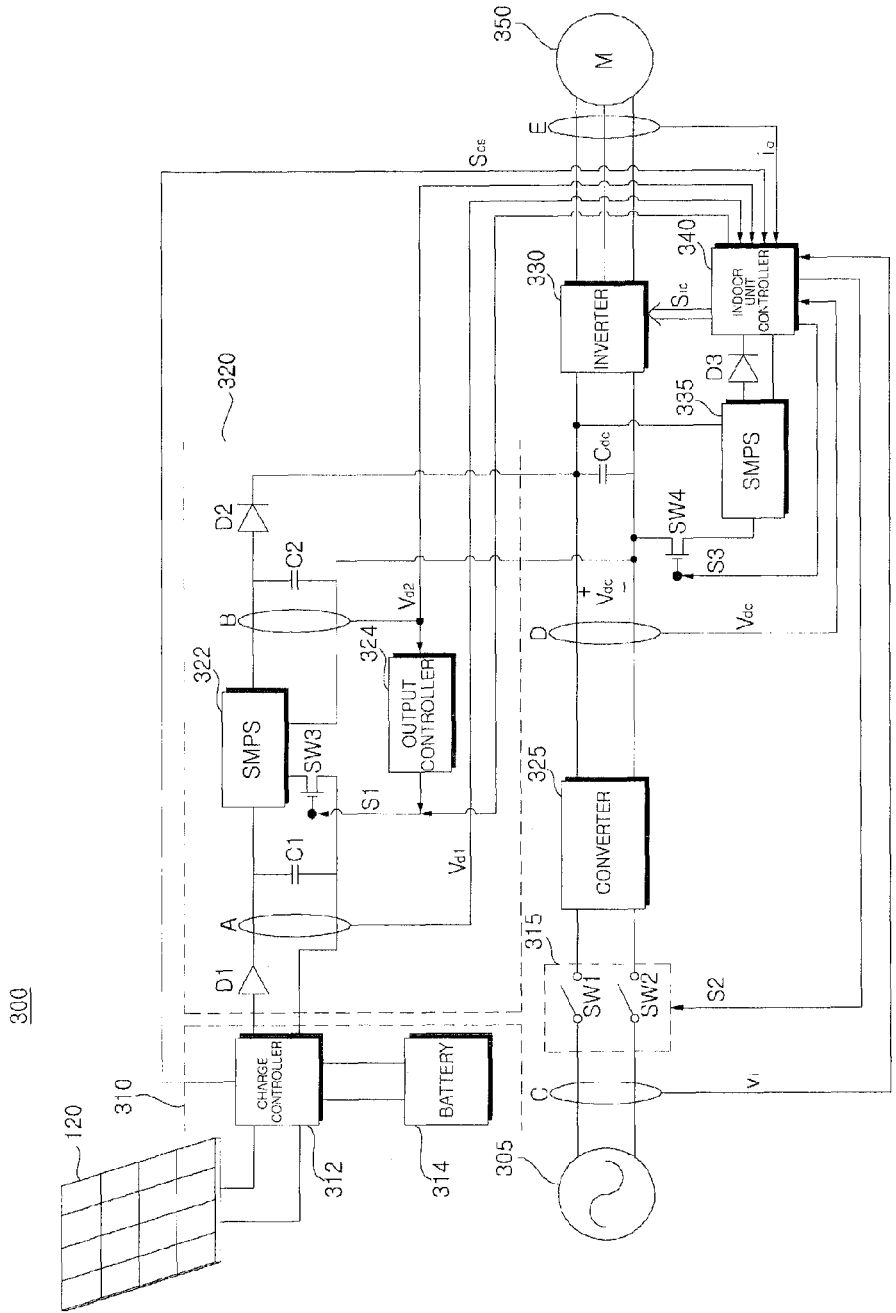
FIG. 6 is a circuit diagram of the indoor unit illustrated in FIG. 1 according to another exemplary embodiment as broadly described herein.

FIG. 6 is a circuit diagram of the indoor unit illustrated in FIG. 1 according to another exemplary embodiment as broadly described herein.

Referring to FIG. 6, the circuit diagram of an indoor unit 300 according to another exemplary embodiment of the present invention is essentially the same as the circuit diagram of the indoor unit 200 illustrated in FIG. 4, except that a charger 310 is additionally provided. The following description will focus on the difference between the indoor units 200 and 300.

The charger 310 includes a charge controller 312 and a battery 314.

The charge controller 312 controls charging of the battery 314 with DC power supplied from the photovoltaic cell 120. Also, the charge controller 312 protects the battery 314 from overcharge or overdischarge. Hence, the charge controller 312 may sense the DC power of the battery 314. The detected DC power may be supplied to the indoor unit controller 340 and information about the DC power of the battery 314 may be used in generating the switching control signal S1 or S2. The detected DC power of the battery 314 may be indicated on a display (not shown).

The battery 314 is charged with DC power from the photovoltaic cell 120 or the DC power is discharged from the battery 314, under the control of the charge controller 312. Especially the battery 314 is charged with DC power obtained by energy conversion from the photovoltaic cell 120 in the day.

Meanwhile, DC power Vbat stored in the battery 314 may be used as auxiliary power in the cooling mode, as standby power in the standby mode, or as consumption power in the automatic photovoltaic mode, as stated before.

Figure 13:
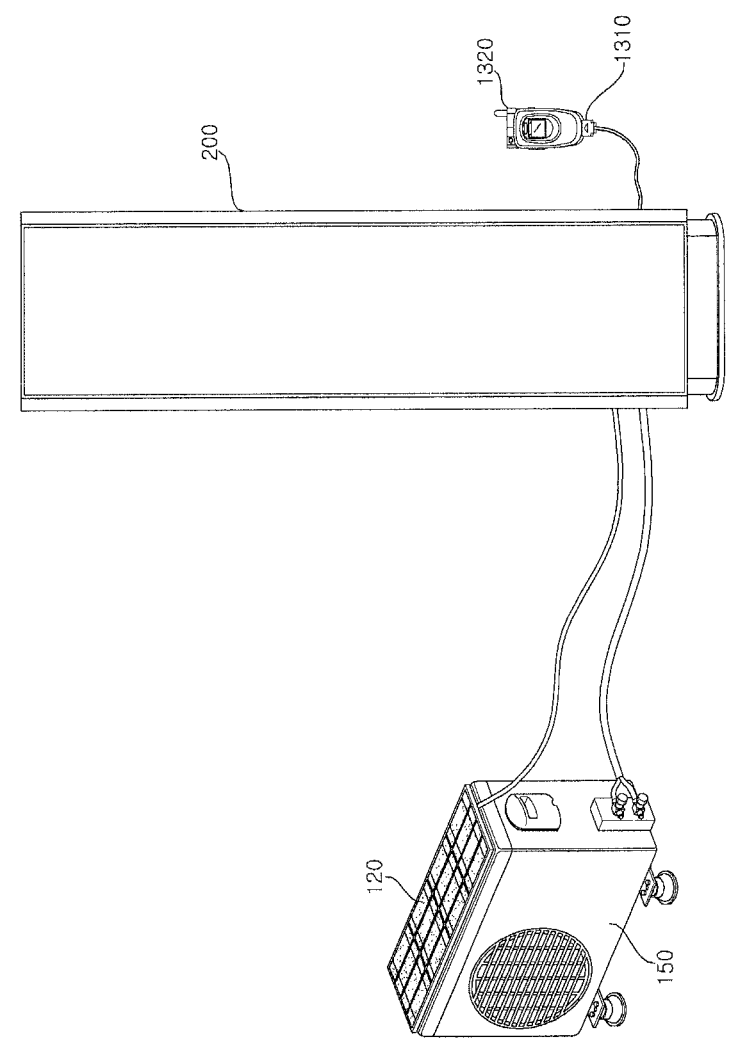
Figure 14:
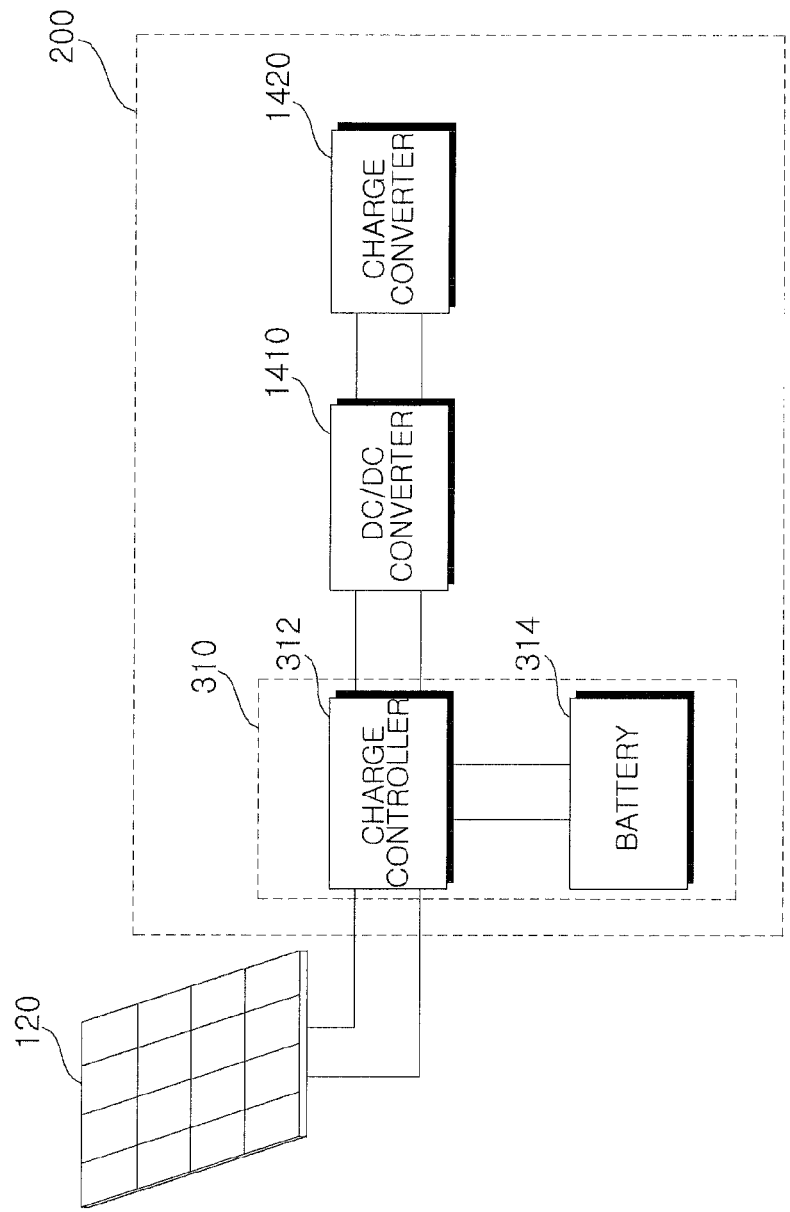
Figure 15:
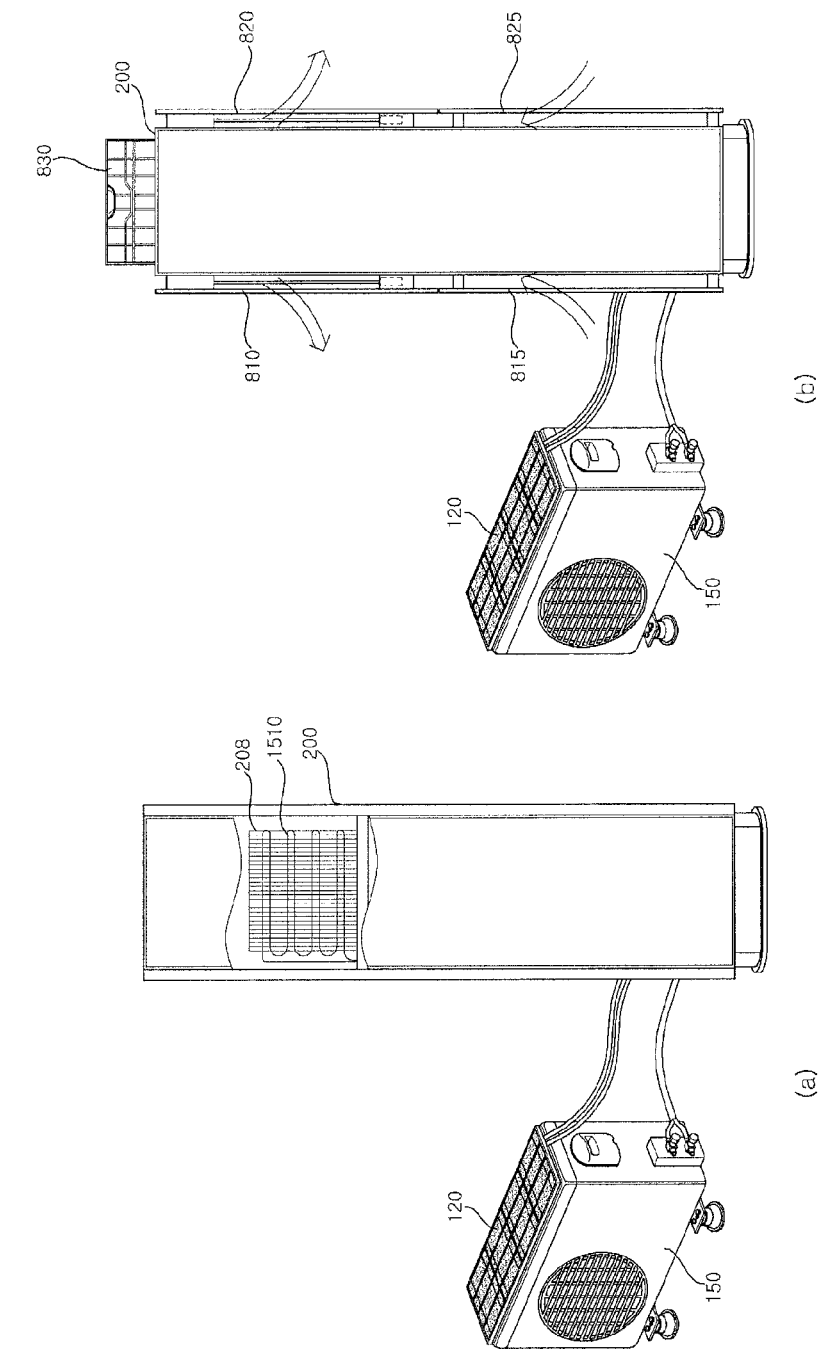

Especially in the automatic photovoltaic mode, the DC power Vbat stored in the battery 314 may be used mainly for controlling charging of other electronic devices (refer to FIGS. 13 and 14).

While the charger 310 is shown as residing within the indoor unit 200 in FIG. 6, to which the present invention is not limited, the charger 310 may be incorporated with the photovoltaic cell 120 into a single module.

Figure 7:
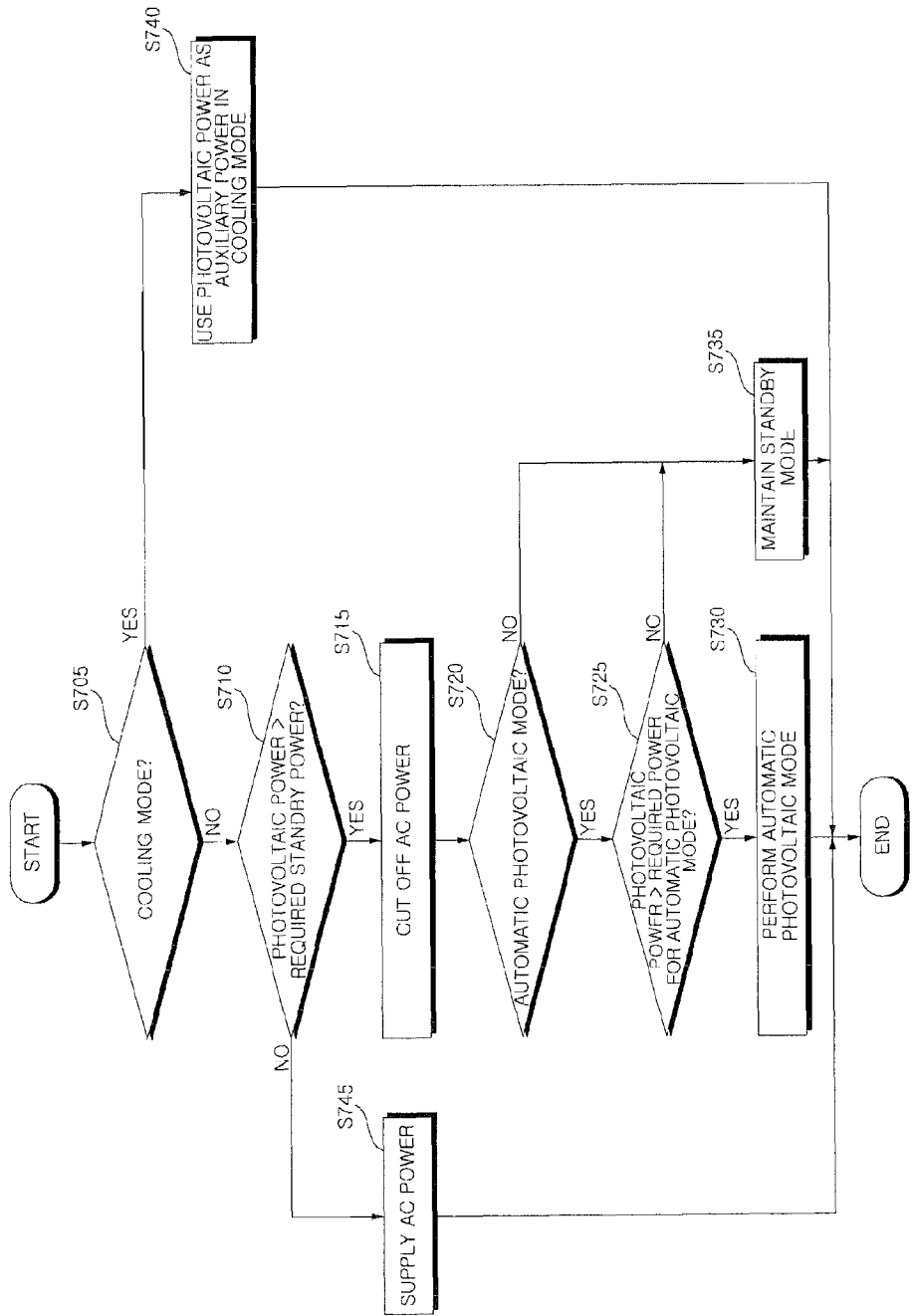
FIG. 7 is a flowchart illustrating an operation of the air conditioner according to an exemplary embodiment as broadly described herein.

FIG. 7 is a flowchart illustrating an operation of the air conditioner according to an exemplary embodiment as broadly described herein, and FIGS. 8 to 19 are views referred to for describing the operation of the air conditioner illustrated in FIG. 7.

Referring to FIG. 7, it is first determined whether a current operation mode is a cooling mode of the air conditioner in step S705. Specifically, the indoor unit controller 240 determines whether the indoor unit 200 is operating in the cooling mode according to user input or automatic setting.

If the indoor unit 200 is in the cooling mode, photovoltaic power supplied from the photovoltaic cell 120 is used as auxiliary power in the cooling mode in step S740. Referring to FIG. 4, both the AC power switching unit 315 and the DC/DC converter 220 are operated so that both the photovoltaic power and commercial utility power may be supplied to the DC-end capacitor Cdc.

The following equation describes the relationship between required power for cooling, and the photovoltaic power and commercial utility power.

$$Pcd = Pso + Pc \qquad \text{[Equation 1]}$$

In equation 1, Pcd denotes the required power consumption for cooling in the indoor unit 200, Pso denotes the photovoltaic power received from the photovoltaic cell 120, and Pc denotes the commercial utility power supplied in the form of the AC power 205.

If the photovoltaic power Pso increases on the assumption that the required power for cooling, Pcd, is constant, the level of the utility power Pc may be decreased. Accordingly, the commercial utility power Pc can be saved.

Referring to FIG. 7 again, if the indoor unit 200 is not operating in the cooling mode, the indoor unit controller 240 compares the photovoltaic power Pso with required standby power Pst in step S710.

The required standby power Pst may be the sum of power consumption for receiving a remote control signal to set an operation of the indoor unit 200 and power consumption for displaying information on the display.

If the required standby power Pst is greater than the photovoltaic power Pso, the indoor unit controller 240 turns on the switching elements SW1 and SW2 of the AC power switching unit 215 to supply the required standby power to the DC-end capacitor Cdc in step S745. Therefore, the AC power 205 is converted to DC power in the converter 225 and is then supplied to the DC-end capacitor Cdc.

On the other hand, if the photovoltaic power Pso is greater than the required standby power Pst, the indoor unit controller 240 cuts off the commercial utility power in step S715. That is, the photovoltaic power Pso is used as standby power. The indoor unit controller 240 turns off the switching elements SW1 and SW2 of the AC power switching unit 215 in order to cut off the commercial utility power to the DC-end capacitor Cdc. Eventually, only the photovoltaic power Pso is supplied to the DC-end capacitor Cdc.

In step S720, the indoor unit controller 240 determines whether the indoor unit 200 has been set to the automatic photovoltaic mode. The automatic photovoltaic mode may be set by an input of the remote controller or an input of a local key provided in the indoor unit 200.

On the other hand, if the indoor unit 200 is not in the automatic photovoltaic mode, the standby mode of step S715 continues in step S735. Therefore, the indoor unit controller 240 turns off the switching elements SW1 and SW2 of the AC power switching unit 215 in order to cut off the commercial utility power to the DC-end capacitor Cdc. Eventually, only the photovoltaic power Pso is supplied to the DC-end capacitor Cdc.

If the indoor unit 200 is in the automatic photovoltaic mode, it is determined whether the photovoltaic power Pso is greater than required power Psa for operating the automatic photovoltaic mode in step S725.

If the photovoltaic power Pso is greater than the required power Psa for operating the automatic photovoltaic mode, the automatic photovoltaic mode is immediately performed in step S730.

On the contrary, if the photovoltaic power Pso is less than required power Psa for operating the automatic photovoltaic mode, the standby mode continues in step S735. If the photovoltaic power Pso exceeds the required power Psa for operating the automatic photovoltaic mode, step S730 is performed again.

Figure 18:
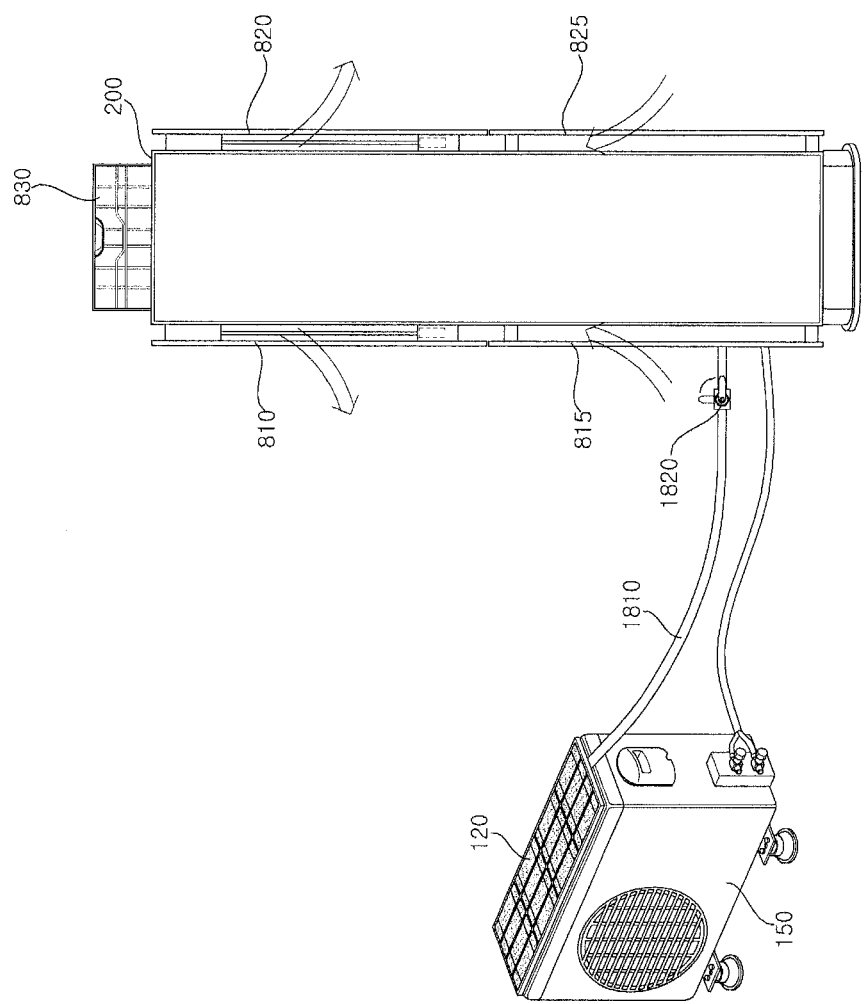
Figure 19:
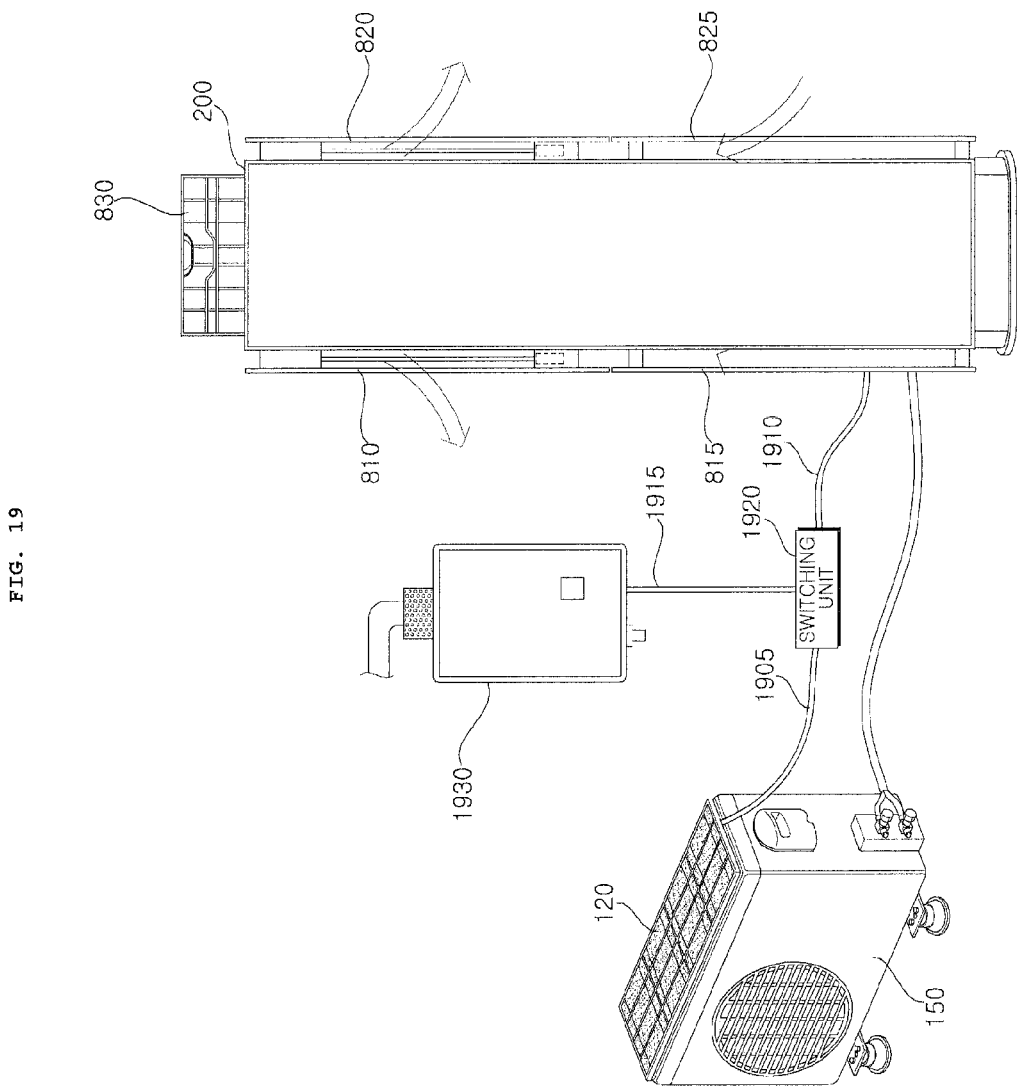

The automatic photovoltaic mode may be at least one of an air purification mode (refer to FIG. 8), an automatic cleaning mode (refer to FIG. 9), a lighting mode (refer to FIG. 10), a display mode (refer to FIGS. 11 and 12), a charge mode (refer to FIGS. 13 and 14), a heat line-based dehumidification mode (refer to FIG. 15), a hot water-based dehumidification mode (refer to FIG. 18), or a hot water-based heating mode (refer to FIG. 19). The automatic photovoltaic mode may further include a defrosting mode (refer to FIGS. 16 and 17).

Now a description will be made of operations of the indoor unit 200 in the automatic photovoltaic modes.

Figure 8:
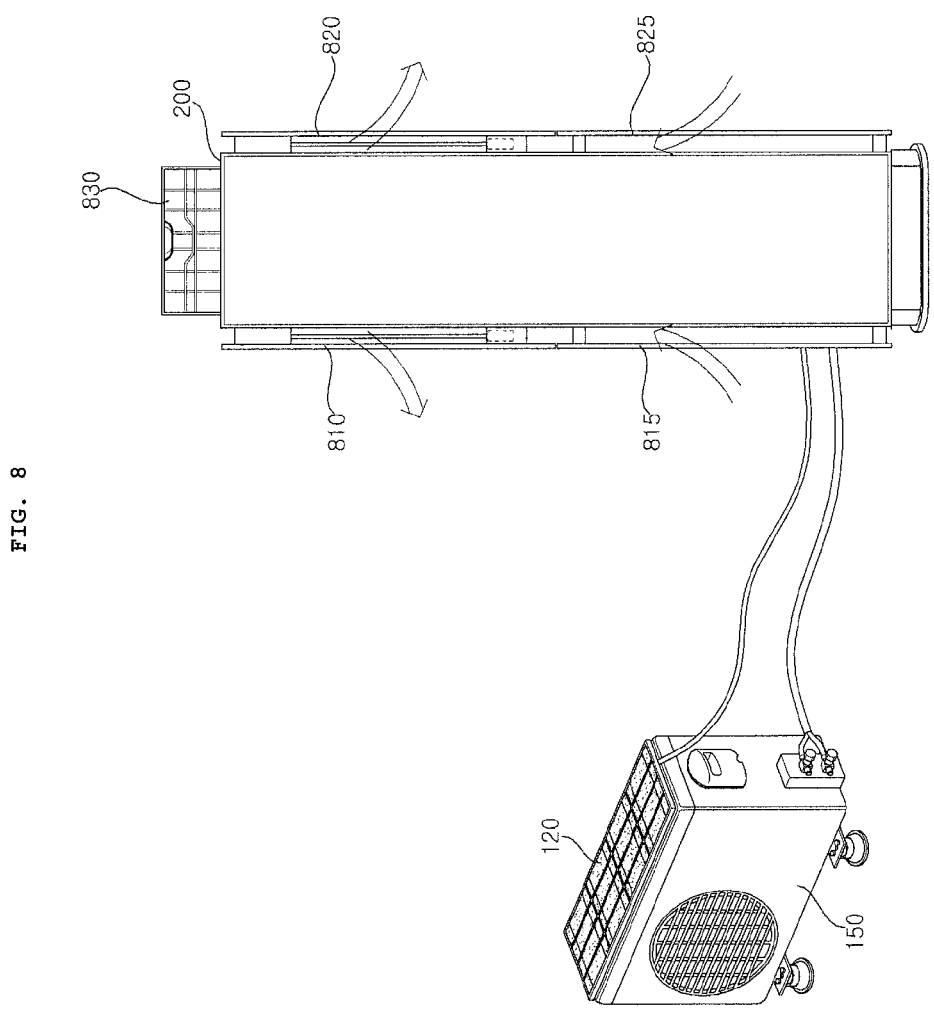
FIGS. 8 to 19 are views referred to for describing operation of the air conditioner illustrated in FIG. 7.

FIG. 8 illustrates an operation of the indoor unit in the air purification mode.

Referring to FIG. 8, when the automatic photovoltaic mode, particularly the air purification mode, has been set and the photovoltaic power Pso is greater than required power for operating the air purification mode, the fan motor 250 of the indoor unit 200 rotates using the photovoltaic power Pso, and vanes 810, 815, 820 and 825 of the indoor unit 200 and a pop-up window 830 are opened using the photovoltaic power Pso. Meanwhile, the compressor 152 of the outdoor unit 150 is not operated, and thus a cooling cycle is not performed. Therefore, air is simply blown by the fan motor 250 without any occurrence of heat exchange in the indoor heat exchanger 208.

In FIG. 8, it is shown by way of example that as air inlets are positioned at lower parts of both side surfaces of a body of the indoor unit 200, the lower vanes 815 and 825 are opened to introduce air, and as air outlets are positioned on upper parts of both side surfaces of the body of the indoor unit 200, the upper vanes 810 and 820 and the pop-up window 830 are opened to exhaust air.

To purify air, at least one of a green tea HEPA filter, a platinum enzyme filter, a total virus filter, and an allergy care filter that are capable of filtering out odors, hazardous materials, bacteria, dust, and viruses may be provided at one or more of the air inlets and the air outlets. It is also possible to sterilize bacteria using nano plasma ions. Therefore, as the air is purified in this manner, fresh air is blown into the interior space.

An air flow rate may be controlled through the vanes 810 and 820 and/or the fan motor 250. Especially a user may be located using an infrared sensor (not shown) attached to the indoor unit 200 and an air flow direction or an air flow rate may be controlled according to the location of the user. For example, as the user is farther from the indoor unit 200, a stronger air may be blown, and as the user is nearer to the indoor unit 200, a weaker air may be blown.

Figure 9:
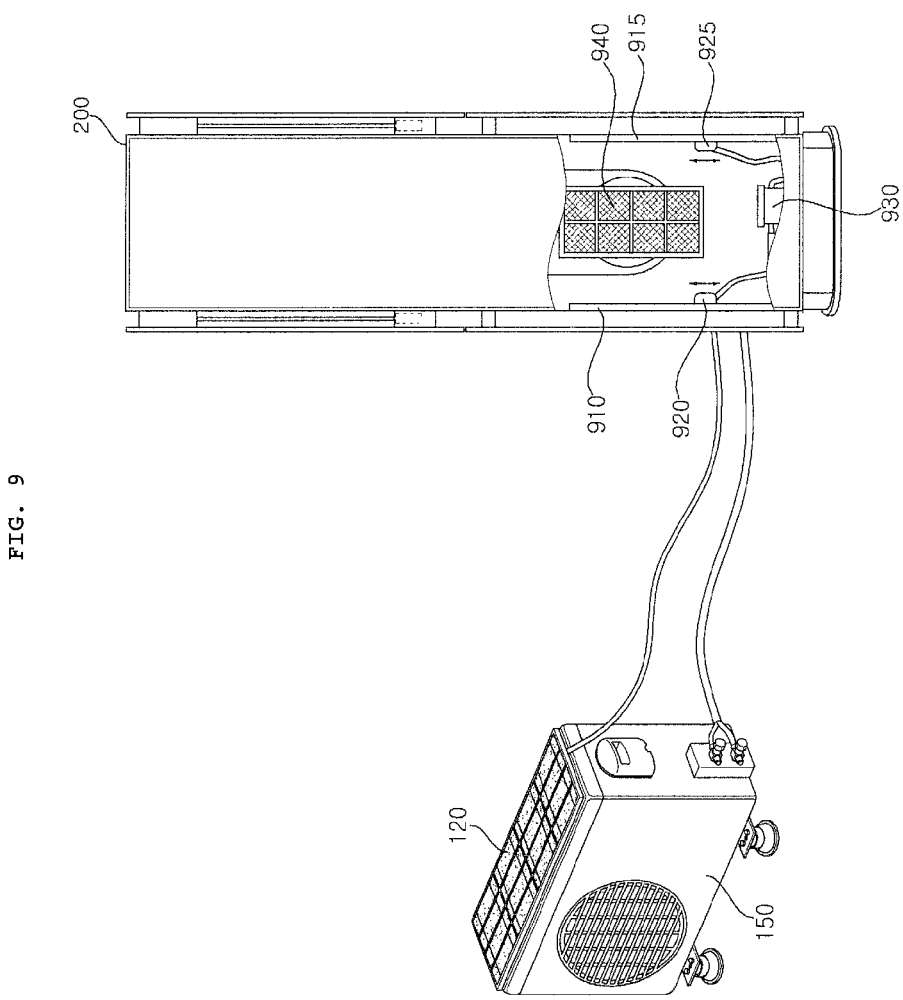

FIG. 9 illustrates an operation of the indoor unit in the automatic cleaning mode.

Referring to FIG. 9, when the automatic photovoltaic mode, particularly the automatic cleaning mode has been set and the photovoltaic power Pso is greater than required power for operating the automatic cleaning mode, automatic cleaning units 920 and 925 are operated using the photovoltaic power Pso to automatically clean filters 910 and 915 provided in the vicinity of the air inlets at both lower side parts of the indoor unit 200. If the filters 910 and 915 are positioned vertically, the automatic cleaning units 920 and 925 also operate vertically. Therefore, the automatic cleaning units 920 and 925 remove foreign materials such as dust from the filters 910 and 915.

While it is shown in FIG. 9 that a foreign material collector 930 may be separately provided to collect the dust-like foreign materials removed by the automatic cleaning units 920 and 925, which should not be construed as limiting embodiments as broadly described herein, the foreign material collector 930 may be incorporated into at least one of the automatic cleaning unit 920 or the automatic cleaning unit 925.

Therefore, air that has been filtered and is thus dust-free is introduced toward the air outlets through a filter 940 and thus fresh air is blown through the air outlets according to the operation of the fan motor 250.

Figure 10:
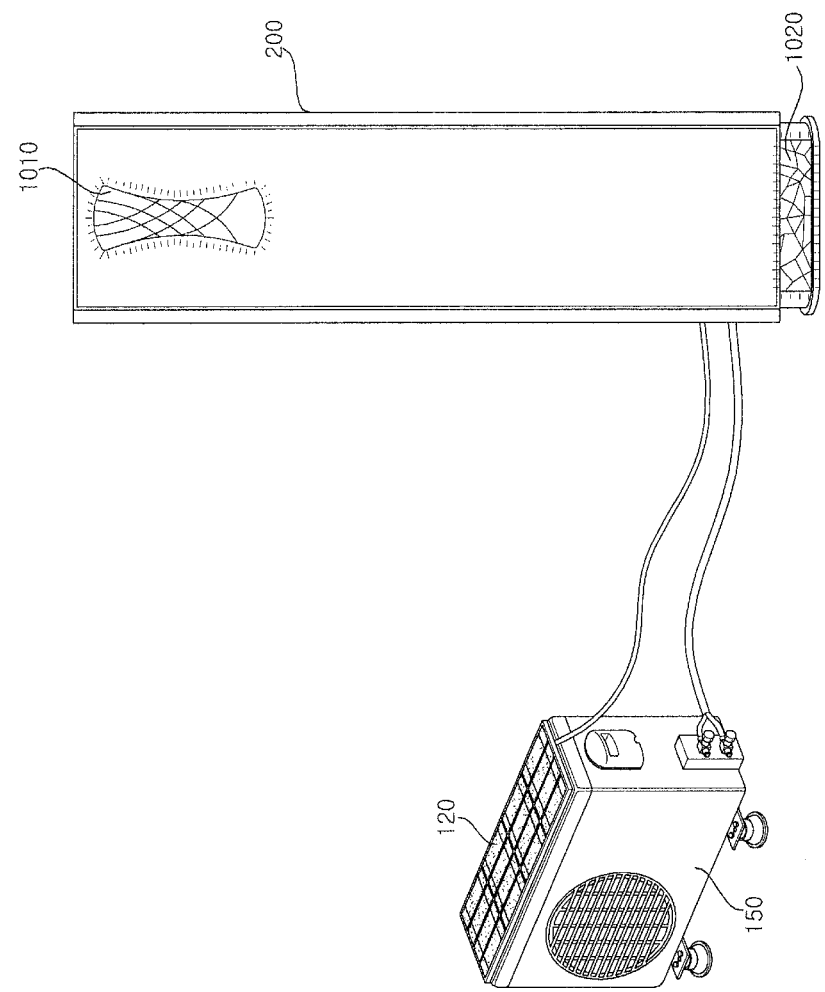

FIG. 10 illustrates an operation of the indoor unit in a lighting mode.

Referring to FIG. 10, when the automatic photovoltaic mode, particularly the lighting mode has been set and the photovoltaic power Pso is greater than required power for operating the lighting mode, lighting units 1010 and 1020 are operated using the photovoltaic power Pso.

Each of the lighting units 1010 and 1020 may include a lamp (not shown) and a light guide (not shown) for diffusing light illuminated from the lamp. The lamp may have a plurality of Light Emitting Diodes (LEDs) and the light guide may be formed of a material such as crystal.

Thus, the lamps may be turned on using the photovoltaic power Pso. For example, the lamps may be turned on at night by photovoltaic power Pso stored in the charger 310 in the day. Therefore, the indoor unit 200 may operate in the lighting mode without additional consumption of commercial utility power.

If LEDs are used for the lamps, mood lighting also called dimming driving is available by changing light intensity according to an ambient environment. For example, if indoor luminance is high, the light intensity of the lamps may be decreased and if indoor luminance is low, the light intensity of the lamps may be increased. The dimming driving may be implemented by use of a dimming driving inverter (not shown) that supplies a driving voltage to the LEDs. The dimming driving inverter may be connected to the DC-end capacitor Cdc.

Even when AC power is not supplied, the lighting units 1010 and 1020 may be operated in the indoor unit by photovoltaic power.

As illustrated in FIG. 4 or FIG. 6, when the input voltage detector C does not sense AC input power, the indoor unit controller 240 may determine that AC power is off and operate the lighting units 1010 and 1020 using the photovoltaic power Pso stored in the charger 310.

For example, when the input voltage detector C does not sense the input power iv for a predetermined time or longer, the indoor unit controller 240 determines AC power-off. To prevent a wrong decision as to whether AC power is off, the switching elements SW1 and SW2 are preferably turned on in the AC power switching unit 215.

If AC power is turned on again, the lighting mode may be released. That is, the lamps of the lighting units 1010 and 1020 may be turned off.

Figure 11:
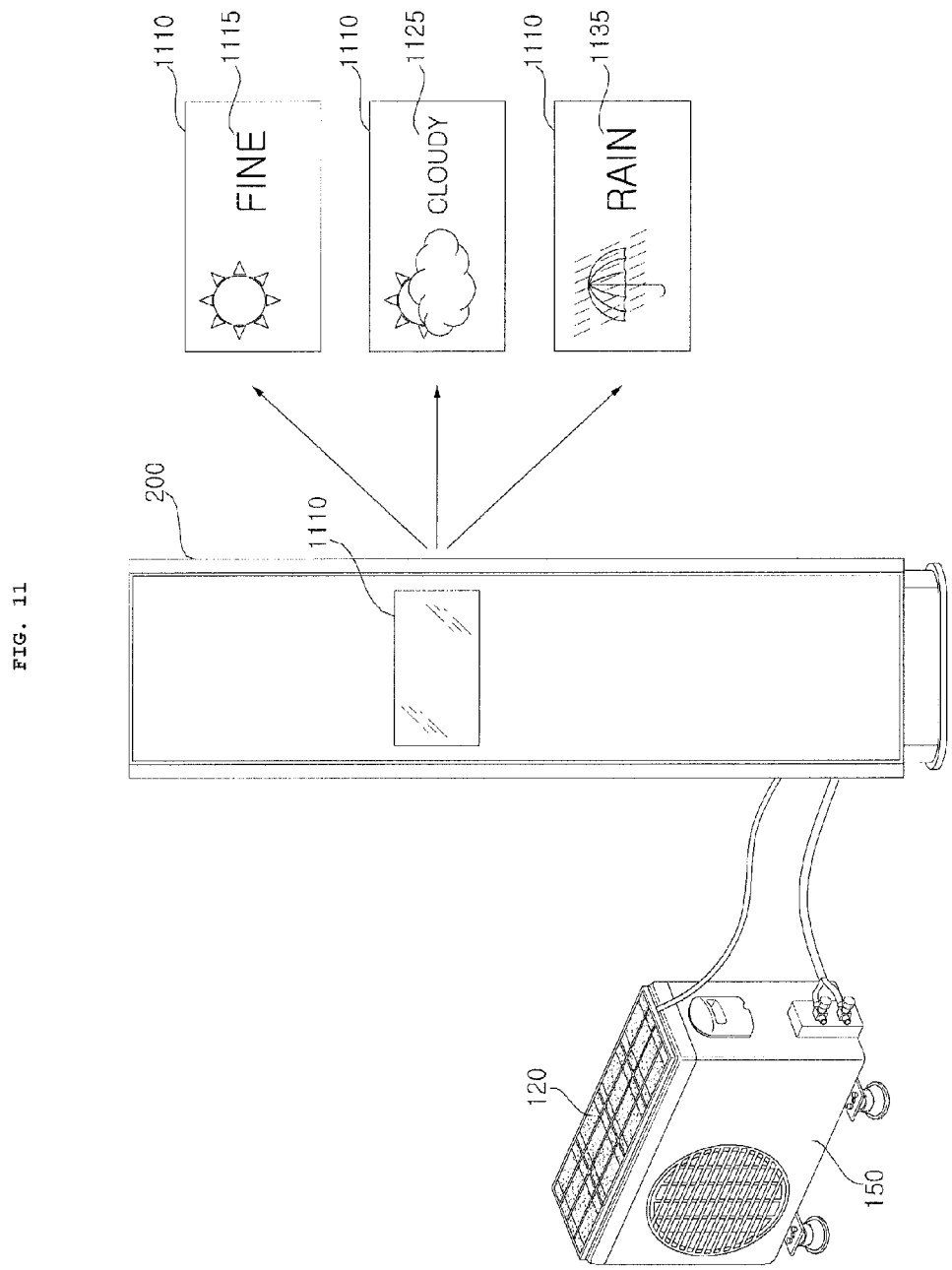

FIG. 11 illustrates an operation of the indoor unit in a display mode.

Referring to FIG. 11, when the automatic photovoltaic mode, particularly the display mode has been set and the photovoltaic power Pso is greater than required power for operating the display mode, predetermined information or images are displayed by operating a display 1110 provided in the indoor unit 200 by the photovoltaic power Pso.

The display 1110 may be configured into a Liquid Crystal Display (LCD), Plasma Display Panel (PDP) or Organic Light Emitting Diode (OLED). The display 1110 may be implemented into a touch screen so as to function as an input unit as well as an output unit. The display 1110 may display information such as information about the operation of the indoor unit 200 using photovoltaic power.

In the illustrated case of FIG. 11, ambient weather information is displayed. For example, the DC current vd1 or vd2 received from the photovoltaic cell 120 may be detected and thus ambient weather may be identified based on the intensity of the DC current vd1 or vd2.

If the intensity of the DC current vd1 or vd2 is equal to or larger than a first threshold, the indoor unit controller 240 may determine that the ambient weather is "fine" and thus display weather information 1115 indicating "fine". If the intensity of the DC current vd1 or vd2 is less than the first threshold and equal to or greater than a second threshold, the indoor unit controller 240 may determine that the ambient weather is "cloudy" and thus display weather information 1125 indicating "cloudy". If the intensity of the DC current vd1 or vd2 is less than the second threshold, the indoor unit controller 240 may determine that it is raining outside and thus display weather information 1135 indicating "raining".

The air conditioner 100 may perform a dehumidification operation or an artificial intelligence operation according to a set logic, referring to the above-described ambient weather information. For example, if it is determined that the ambient weather is "fine", the air conditioner 100 may automatically operate to cool air. If it is determined that the ambient weather is "cloudy", the air conditioner 100 may cool air by changing a set target indoor temperature. If it is determined that it is "raining" outside, the air conditioner 100 may automatically operate to dehumidify air.

When it is cloudy or raining outside, the photovoltaic power Pso used for operating the display 1110 is preferably power stored in the charger 310.

Figure 12:
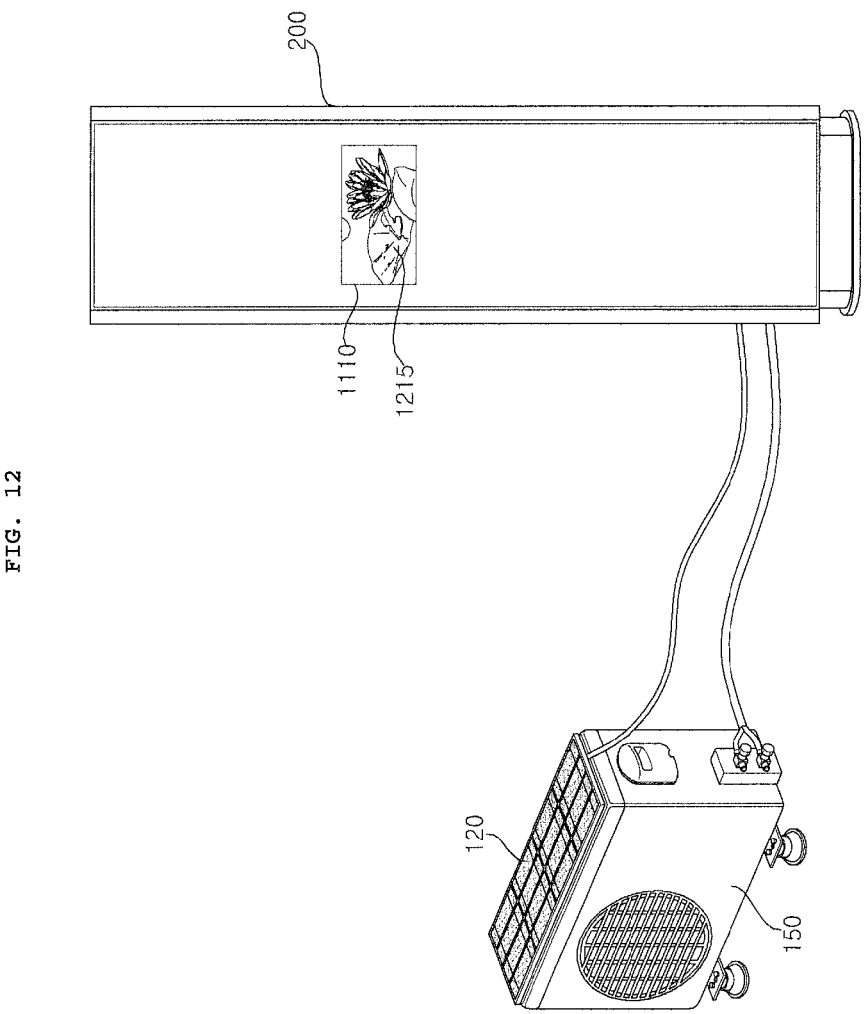

FIG. 12 illustrates an operation of the indoor unit in an electronic frame mode.

Referring to FIG. 12, when the automatic photovoltaic mode, particularly the automatic frame mode has been set and the photovoltaic power Pso is greater than required power for operating the automatic frame mode, the display 1110 is operated in the automatic frame mode in the indoor unit 200 by the photovoltaic power Pso.

In the electronic frame mode, a still image 1215, a moving picture, an Internet Web page including weather information, stock information, and other life information, a clock, and a calendar may be displayed on the display 1110. In addition, the electronic frame mode may involve audio output.

When the photovoltaic power Pso is used for displaying information and outputting sound in the electronic frame mode, the electronic frame mode can be operated without supplying the AC power 205 to the indoor unit 200. Consequently, the AC power Pc is saved.

FIGS. 13 and 14 illustrate an operation of the indoor unit in a charge mode.

Referring to FIGS. 13 and 14, when the automatic photovoltaic mode, particularly the charge mode has been set and the photovoltaic power Pso is greater than required power for operating the charge mode, a charging voltage is supplied to a charge connector 1310 provided in the indoor unit 200 by the photovoltaic power Pso.

For the charge mode, the indoor unit 200 may include a DC/DC converter 1410 and the charge connector 1310 or 1420. The charger 310 may include the charge controller 312 and the battery 314, as illustrated in FIG. 6.

The level of DC power stored in the charger 310 or the level of DC power supplied from the photovoltaic cell 120 is changed in the DC/DC converter 1410 and directly output to the charge connector 1310 or 1420. The DC/DC converter 1410 may be the DC/DC converter 220 of FIG. 4 or the DC/DC converter 320 of FIG. 6.

The DC power supplied to the charge connector 1310 may be obtained by deboosting the DC voltage of the DC-end capacitor Cdc. For example, the DC power supplied to the charge connector 1310 may be about 12V.

As the DC power is supplied to the charge connector 1310, other electronic devices may be charged. For example, a battery of a portable phone 1320 may be charged as illustrated in FIG. 13 or a battery of a lantern may be charged.

If the DC power vd2 output from the DC/DC converter 1410 is equal to or lower than a first threshold or the DC power vd2 charged in the charger 310 is equal to or lower than a second threshold, the indoor unit controller may not operate the DC/DC converter 1410 so that the DC power vd2 is not supplied to the charge connector 1310 or 1420.

When power runs out while charging another electronic device, the indoor unit controller may also cut off the DC power vd2 to the charge connector 1310 or 1420. The display may display the level of power charged in the electronic device. Especially when power runs out while charging the electronic device, the display may display the level of power charged in the electronic device thus far. The level of charged power may be calculated based on the output voltage vd2 detected by the output voltage detector B of the DC/DC converter 1410.

If sufficient power is supplied from the photovoltaic cell 120 or the charger 310 later, the DC power vd2 is supplied again to the charge connector 1310 or 1420.

Since another electronic device is charged with photovoltaic power in the above manner, power consumption can be reduced.

FIGS. 15A and 15B illustrate an operation of the indoor unit in a heat line-based dehumidification mode.

Referring to FIG. 15A, when the automatic photovoltaic mode, particularly the dehumidification mode has been set and the photovoltaic power Pso is greater than required power for operating the heat line-based dehumidification mode, a heat line 1510 attached to the indoor heat exchanger 208 is operated by the photovoltaic power Pso.

The indoor heat exchanger 208 may operate in a cooling cycle in summer and in a heating cycle in winter.

When the indoor heat exchanger 208 operates in a cooling cycle, moisture is collected around the heat exchanger 208. If the heat exchanger 208 is left without being dried, it may emit a disagreeable odor, get moldy, and gather bacteria. To avoid this problem, the heat line 1510 is operated using the photovoltaic power Pso. Specifically, a switching element (not shown) is turned on to provide electrical energy to the heat line 150. Accordingly, the indoor heat exchanger 208 may be dried or sterilized.

On the other hand, if the indoor heat exchanger 208 operates in a heating cycle, warm air is created at the heat exchanger 208. If the heat line 1510 operates in this state, it may function as an auxiliary heater.

FIG. 15B illustrates blowing warm air into the interior space by opening the vanes 810, 815, 820 and 825 or the pop-up window 830 along with the operation of the heat line. This operation may be performed for drying or sterilizing the air in summer or heating the air in winter.

The heat line-based dehumidification mode may be carried out using the DC power vd1 or vd2 from the photovoltaic cell 120 without using an additional charger.

Figure 16:
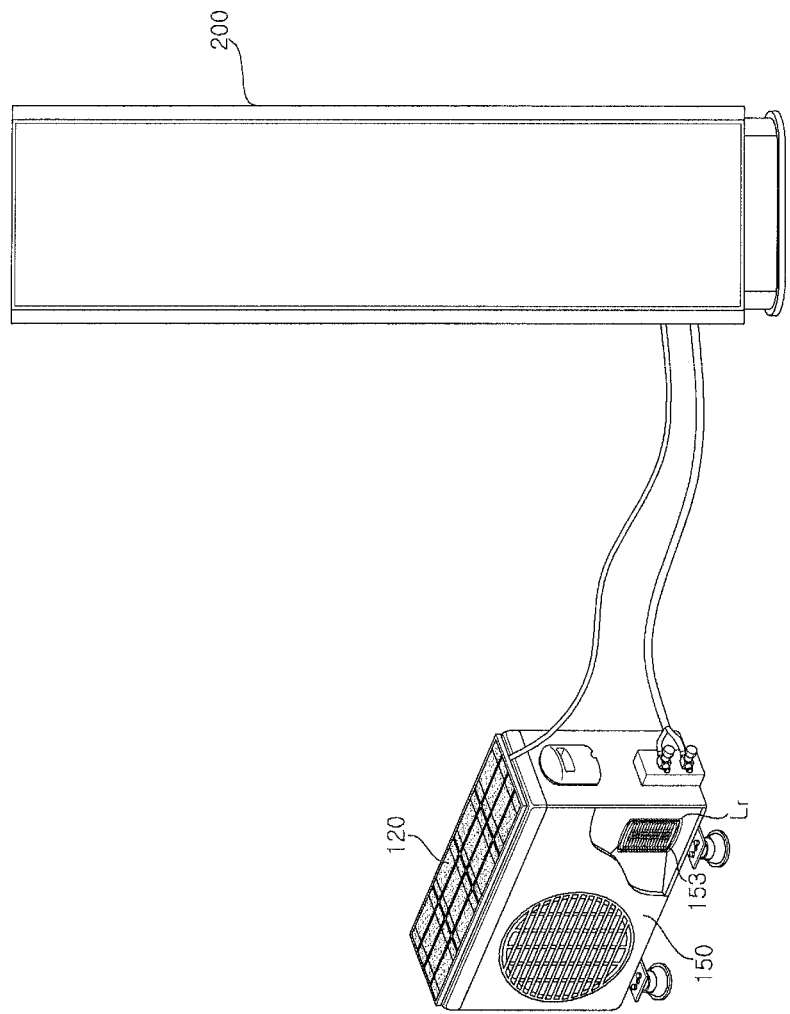
Figure 17:
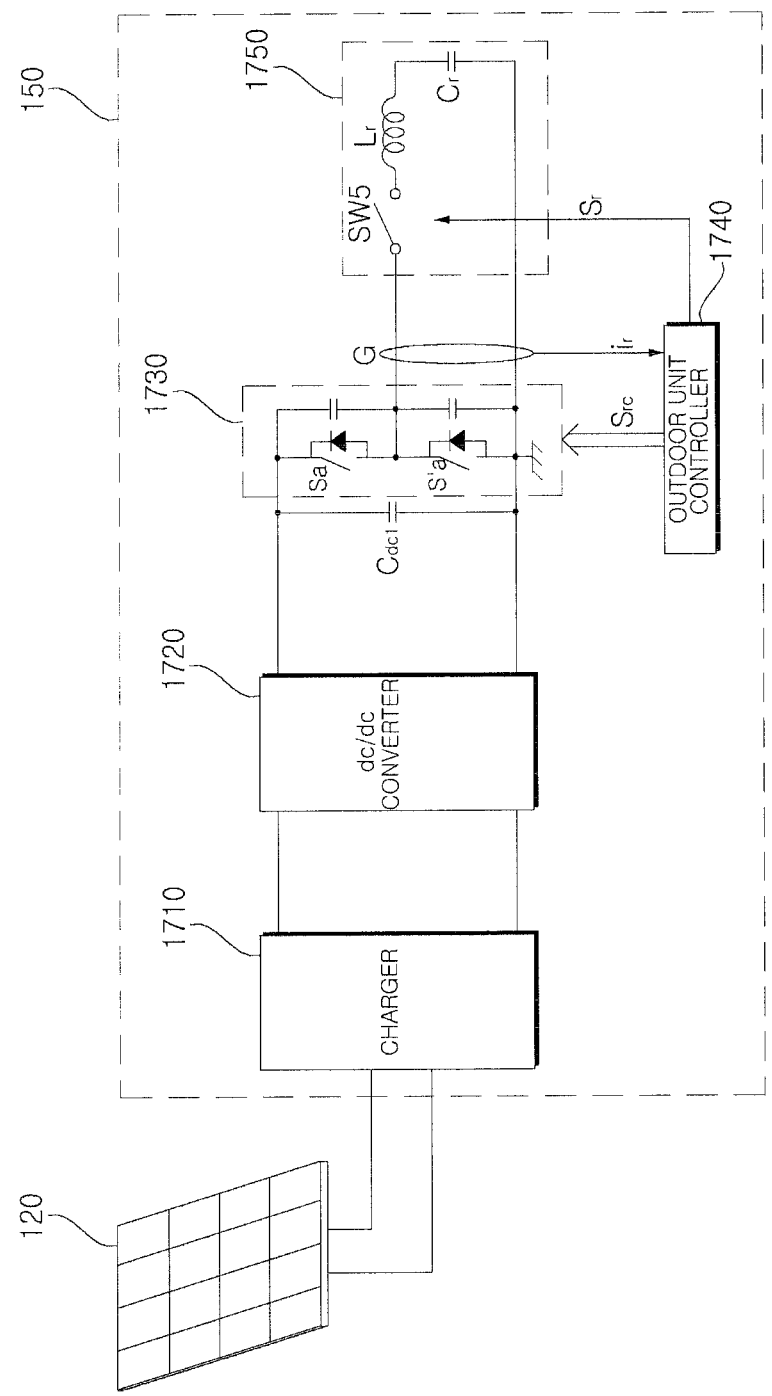

FIGS. 16 and 17 illustrate an operation of the outdoor unit in a defrosting mode.

Referring to FIGS. 16 and 17, the outdoor unit 150 may operate in the defrosting mode by photovoltaic power.

For example, when the air conditioner 100 operates as a heat pump, the cooling/heating switching valve 160 switches on in a direction determined according to an electrical signal. For cooling, the cooling/heating switching valve 160 switches high-temperature, high-pressure refrigerant received from the compressor 152 to the outdoor unit 150 so that the outdoor unit 150 may extract heat from the refrigerant. For heating, the cooling/heating switching valve 160 switches high-temperature, high-pressure refrigerant received from the compressor 152 to the indoor unit 200 so that the indoor unit 200 may extract heat from the refrigerant. When the air conditioner 100 operates for heating in winter, an ambient temperature drops and thus the surface of the outdoor heat exchanger 154 of the outdoor unit 150 may be frosted. As a result, the refrigerant may drop below zero, thus degrading the heating performance of the air conditioner 100. Although this problem may be averted by discontinuing blowing of warm air from the indoor unit 200 and instead, running a cooling cycle temporarily in the heating mode, a large amount of commercial utility power is consumed.

In this exemplary embodiment of the present invention, the outdoor unit 150 operates in the defrosting mode, simply by the photovoltaic power Pso during a heating operation of the indoor unit 200.

For this purpose, the outdoor unit 150 may be provided with a coil or heat line on the accumulator 153 or the outdoor heat exchanger 154. The operation of the heat line has been described in detail with reference to FIGS. 15A and 15B and thus a description thereof will not be repeated herein.

If a coil is provided on the accumulator 153 or the outdoor heat exchanger 154, the coil may be an induction heating coil Lr. FIG. 17 is a circuit diagram of the outdoor unit 150 having an induction heating coil Lr.

Referring to FIG. 17, the outdoor unit 150 may include a charger 1710, a DC/DC converter 1720, an inverter 1730, an outdoor unit controller 1740, and an induction heater 1750.

As described before, the charger 1710 is charged with photovoltaic power and the DC/DC converter 1720 changes the level of the photovoltaic power.

The inverter 1730 includes a plurality of switching elements and converts smoothed DC power to AC power having a predetermined frequency.

The inverter 1730 is provided with upper arm and lower arm switching elements Sa and S'a connected to each other serially. Diodes are connected in inverse parallel to the respective switching elements Sa and S'a. In addition, a capacitor may be connected to each of the switching elements Sa and S'a, in parallel. The switching elements Sa and S'a of the inverter 1730 turn on or off according to a switching control signal received from the outdoor unit controller 1740. The switching elements Sa and S'a may be complementary to each other in operation.

The induction heater 1750 may include the induction heating coil Lr and a resonant capacitor Cr connected to the induction heating coil Lr for resonation. The induction heater 1750 may further include a switching element SW5 for supplying high-frequency current received from the inverter 1730.

As described before, if high-frequency AC power is supplied to the induction heating coil Lr provided on the accumulator 153 or the outdoor heat exchanger 154 in the outdoor unit 150, a magnetic field is generated at the induction heating coil Lr due to resonation caused by the induction heating coil Lr and the resonant capacitor Cr. The resulting electromagnetic induction effect induces Eddy current to the accumulator 153 or the outdoor heat exchanger 154. The Eddy current produces Joule heat in the accumulator 153 or the outdoor heat exchanger 154.

Meanwhile, the outdoor unit controller 1740 may provide overall control to the outdoor unit 150. For example, the outdoor unit controller 1740 may output a Pulse Width Modulation (PWM) switching control signal Src.

The outdoor unit controller 1740 may discontinue the operation of the inverter 1730, upon determining that an abnormality has occurred based on temperature sensed by a temperature sensor (not shown) for sensing temperature around the induction heating coil Lr and an output current it detected by an output current detector G.

In this manner, the outdoor unit 200 can operate in the defrosting mode simply, thereby reducing consumption of commercial utility power.

FIG. 18 illustrates a hot water-based dehumidification mode.

Referring to FIG. 18, when the automatic photovoltaic mode, particularly the hot water-based dehumidification mode has been set and the photovoltaic power Pso is greater than required power for operating the hot water-based dehumidification mode, the hot water-based dehumidification mode is performed by the photovoltaic power Pso.

Specifically, water may be heated in a hot water pipe 1810 using the photovoltaic power Pso and supplied to the indoor unit 200 by operating a hot water valve 1820. Similarly to the manner illustrated in FIGS. 15A and 15B, the heated water may flow through a hot water pipe (not shown) provided in the indoor heat exchanger 208, for use in blowing warm air into the interior space.

For example, the air conditioner 100 may dehumidify air after running in a cooling cycle. That is, the air conditioner 100 runs a cooling cycle according to a set target humidity. If a current humidity is lower than the target humidity, the cooling cycle operation is discontinued.

To maintain temperature constant indoors, the indoor temperature is measured. If the indoor temperature drops, the hot water valve 1820 is opened to thereby prevent a further decrease in the indoor temperature. If the indoor temperature is raised, the hot water valve 1820 is closed. To perform the operation, the indoor unit 200 may further include a humidity sensor and a temperature sensor.

Compared to a dehumidifying operation in which only a cooling cycle is performed, this dehumidification mode can blow warm air, not cool air, thereby dehumidifying air at or below a predetermined temperature.

FIG. 19 illustrates a hot water-based heating mode.

Referring to FIG. 19, when the automatic photovoltaic mode, particularly the hot water-based heating mode, has been set and the photovoltaic power Pso is greater than required power for operating the hot water-based heating mode, the hot water-based heating mode is performed using the photovoltaic power Pso.

Although the heating mode illustrated in FIG. 19 is similar to the hot water-based dehumidification mode illustrated in FIG. 18, they differ in that the air conditioner 100 includes a switching unit 1920 to switch supply of hot water to a boiler 1930 or the indoor unit 200 in the heating mode.

Since hot water is supplied to the boiler 1930 by the photovoltaic power, the hot water may be used for floor heating.

While only the photovoltaic cell 120 is shown in FIG. 19, a photovoltaic panel (not shown) may be provided at a side of the photovoltaic cell 120.

As heat energy from the photovoltaic panel is transferred to the indoor heat exchanger 208 of the indoor unit 200 through a hot water pipe 1910, warm air may be blown into the interior space and the heat energy may be partially transferred to the boiler 1930 through a hot water pipe 1915 to heat the floor. Therefore, a heating system can be realized with an optimum efficiency.

As is apparent from the above description of the embodiments of the present invention, photovoltaic power is supplied to an indoor unit of an air conditioner, for use as at least one of standby power in a standby mode, operation power in an automatic photovoltaic mode, or auxiliary power in a cooling mode. Therefore, commercial utility power can be saved.

Especially when the photovoltaic power is used as the standby power in the standby mode, AC power is cut off and thus AC power is not consumed in the indoor unit. Also, power consumption efficiency is increased by using the photovoltaic power as the auxiliary power in the cooling mode.

Since the photovoltaic power is used in the automatic photovoltaic mode such as an air purification mode, an automatic cleaning mode, a lighting mode, a display mode, and a dehumidification mode, fresh air can be supplied and thus use convenience is increased.

Even when AC power is not supplied, the photovoltaic power can be used as emergency power. Thus, the circuitry of the indoor unit is more stable.

The photovoltaic power may be utilized for various purposes such as water heating.

The photovoltaic power can be supplied to an outdoor unit and thus used for defrosting or dehumidifying an accumulator or a heat exchanger. Consequently, commercial utility power can be saved.

The air conditioner using photovoltaic energy according to the foregoing exemplary embodiments is not restricted to the exemplary embodiments set forth herein. Therefore, variations and combinations of the exemplary embodiments set forth herein may fall within the scope of the present invention.

While the present invention has been particularly shown and described with reference to exemplary embodiments thereof, it will be understood by those of ordinary skill in the art that various changes in form and details may be made therein without departing from the spirit and scope of the present invention as defined by the following claims.

An air conditioner using photovoltaic energy as embodied and broadly described herein may reduce power consumption.

An air conditioner using photovoltaic energy as embodied and broadly described herein may use photovoltaic power as standby power for an indoor unit.

An air conditioner using photovoltaic energy as embodied and broadly described herein may operate an indoor unit in an automatic photovoltaic mode by photovoltaic power.

An air conditioner using photovoltaic energy as embodied and broadly described herein may protect circuitry of an indoor unit when AC power is off.

An air conditioner using photovoltaic energy as embodied and broadly described herein may operate an outdoor unit in a defrosting mode by photovoltaic power.

An air conditioner using photovoltaic energy as embodied and broadly described herein may include a photovoltaic cell for converting photovoltaic energy into Direct Current (DC) power, an indoor unit for exchanging heat, and an outdoor unit for exchanging heat. Photovoltaic power generated by the photovoltaic cell is supplied to the indoor unit and used as at least one of standby power in a standby mode, consumption power in an automatic photovoltaic mode, or auxiliary power in a cooling mode.

The indoor unit may include a DC-to-DC converter for changing a level of the DC power from the photovoltaic cell, an Alternating Current (AC) switching unit for switching input AC power, a converter for converting the AC power to DC power, and a capacitor for storing at least one of the level-changed DC power or the DC power converted by the converter.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An air conditioner, comprising:
an indoor device that performs heat exchange;
an outdoor device that performs heat exchange;
a photovoltaic cell that converts photovoltaic energy into direct current (DC) power and supplies the DC power from the photovoltaic cell to the indoor device; and
a controller that controls operation of the indoor device, wherein the controller controls the indoor device to use the DC power supplied by the photovoltaic cell as a demand power required by the air conditioner in an automatic photovoltaic mode of the air conditioner, wherein the automatic photovoltaic mode includes at least one of an air cleaning mode, an automatic cleaning mode, a lighting mode, a display mode, a dehumidification mode, an electronic frame mode, a charge mode, a defrosting mode, or a heating mode, and wherein the indoor device includes:

a DC-to-DC converter that changes a level of the DC power from the photovoltaic cell;
an Alternating Current (AC) switching device that switches an input AC power;
a converter that converts the input AC power to a DC power;
a capacitor that smoothes at least one of the level-changed DC power or the DC power converted by the converter;
an inverter including a plurality of inverter switching elements that converts the DC power from the capacitor to AC power having a predetermined frequency and a predetermined level, and outputs the converted AC power to a motor; and
a first switching mode power supply (SMPS) that changes a level of the DC power from the capacitor and outputs the level-changed DC power from the capacitor to the controller.

2. The air conditioner of claim 1, wherein the photovoltaic cell is provided on a top surface of the outdoor device and is operably coupled to the indoor device to selectively supply the DC power from the photovoltaic cell to the indoor device.

3. The air conditioner of claim 1, wherein when the controller controls the indoor device to use the DC power supplied by the photovoltaic cell as the demand power in the automatic photovoltaic mode, the controller temporarily suspends operation in the automatic photovoltaic mode when no power is available from the photovoltaic cell, and the controller resumes operation in the automatic photovoltaic mode when the DC power available from the photovoltaic cell exceeds the demand power required by the indoor device.

4. The air conditioner of claim 1, wherein when the controller controls the indoor device to use the DC power supplied by the photovoltaic cell as the demand power in the automatic photovoltaic mode and the air conditioner operates in the air cleaning mode of the automatic photovoltaic mode of the air conditioner, the controller opens at least one of a vane or a pop-up window of the indoor device and drives a fan motor of the indoor device using the power from the photovoltaic cell.

5. The air conditioner of claim 1, wherein when the controller controls the indoor device to use the DC power supplied by the photovoltaic cell as the demand power in the automatic photovoltaic mode and the air conditioner operates in the air cleaning mode of the automatic photovoltaic mode of the air conditioner the controller operates an automatic cleaning device that removes foreign materials from a filter provided at an air inlet of the indoor device using the DC power from the photovoltaic cell.

6. The air conditioner of claim 1, wherein when the controller controls the indoor device to use the DC power supplied by the photovoltaic cell as the demand power in the automatic photovoltaic mode and the air conditioner operates in the lighting mode of the automatic photovoltaic mode of the air conditioner or when the input AC power is not supplied to the indoor device, the controller applies the DC power from the photovoltaic cell to operate a lighting device provided in a body of the indoor device that emits light.

7. The air conditioner of claim 1, further comprising an energy storage device that receives and stores the DC power from the photovoltaic cell, the energy storage device comprising a charger, wherein when the controller controls the indoor device to use the DC power supplied by the photovoltaic cell as the demand power in the automatic photovoltaic mode and the controller operates the air conditioner in the charge mode of the automatic photovoltaic mode, the charger outputs the power stored therein to a charge connector of the indoor device.

8. An air conditioner, comprising:
an indoor device that performs heat exchange;
an outdoor device that performs heat exchange;
a photovoltaic cell that converts photovoltaic energy into direct current (DC) power and supplies the DC power from the photovoltaic cell to the indoor device; and
a controller that controls operation of the indoor device, wherein the controller controls the indoor device to use the DC power supplied by the photovoltaic cell as at least one of a standby power in a standby mode of the air conditioner or an auxiliary power in a cooling mode of the air conditioner, and wherein the indoor device includes:
a DC-to-DC converter that changes a level of the DC power from the photovoltaic cell;
an Alternating Current (AC) switching device that switches an input AC power;
a converter that converts the input AC power to a DC power;
a capacitor that smoothes at least one of the level-changed DC power or the DC power converted by the converter;
an inverter including a plurality of inverter switching element that converts the DC power from the capacitor to AC power having a predetermined frequency and a predetermined level, and outputs the converted AC power to a motor; and
a first switching mode power supply (SMPS) that changes a level of the DC power from the capacitor and outputs the level-changed DC power from the capacitor to the controller.

9. The air conditioner of claim 8, wherein when the DC power supplied by the photovoltaic cell is used as the standby power in the standby mode, the controller blocks the input Alternating Current (AC) power from flowing through the indoor device.

10. The air conditioner, of claim 8, wherein when the controller controls the indoor device to use the DC power supplied by the photovoltaic cell as the standby power in the standby mode of the air conditioner if the DC power is greater than the standby power in the standby mode, the DC-to-DC converter outputs the level-changed DC power to the capacitor, and a switching element of the AC switching device is turned off so that the input AC power is blocked from being supplied to the converter.

* * * * *